US012580920B2

(12) United States Patent
    Spivack

(10) Patent No.: US 12,580,920 B2
(45) Date of Patent: Mar. 17, 2026

(54) SYSTEM AND METHOD FOR FACILITATING USER INTERACTION WITH A SIMULATED OBJECT ASSOCIATED WITH A PHYSICAL LOCATION

(71) Applicant: Samsung Electronics Co., Ltd., Suwon-si (KR)

(72) Inventor: Nova T. Spivack, Redmond, WA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/369,557

(22) Filed: Sep. 18, 2023

(65) Prior Publication Data

US 2024/0007474 A1      Jan. 4, 2024

Related U.S. Application Data

(63) Continuation of application No. 17/103,081, filed on Nov. 24, 2020, now Pat. No. 11,765,175, which is a
(Continued)

(51) Int. Cl.
H04L 9/40 (2022.01)
G06F 3/01 (2006.01)
(Continued)

(52) U.S. Cl.
CPC ............ H04L 63/102 (2013.01); G06F 3/011 (2013.01); G06F 3/0482 (2013.01);
(Continued)

(58) Field of Classification Search
CPC ...... A63F 13/71; A63F 13/211; A63F 13/216; A63F 13/217; A63F 13/332; A63F 13/65;
(Continued)

(56) References Cited

U.S. PATENT DOCUMENTS 4,519,490 A    5/1985  White
4,829,899 A    5/1989  Wiker et al.
             (Continued)

FOREIGN PATENT DOCUMENTS

EP       0926614 A2    6/1999
WO    2006/024866 A1    3/2006
             (Continued)

OTHER PUBLICATIONS

"Object-Oriented Programming," as shown in http://en.wikipedia. org/wiki/Objectoriented_ programming, dated Apr. 22, 2009, last accessed Nov. 4, 2013; pp. 1-9.
(Continued)

*Primary Examiner* — Nicholas Augustine
(74) *Attorney, Agent, or Firm* — Jefferson IP Law, LLP

(57)      ABSTRACT

A method of facilitating interaction, via a device, with a simulated object that is associated with a physical object other than a user at a physical location in a real environment is provided. The method includes rendering a user interface including a map of a physical location, receiving a selection of a region on the map made by the user via the user interface, obtaining location data of the device while displaying at least one image obtained by a camera of the device, in response to determining that the location data obtained by the device satisfies a criterion specifying where the simulated object associated with the physical object can be generated, providing a simulated object with the at least one image obtained by the camera, and automatically adjusting the simulated object based on change of a motion of the device.

19 Claims, 20 Drawing Sheets

Related U.S. Application Data continuation of application No. 14/826,123, filed on Aug. 13, 2015, now Pat. No. 10,855,683, which is a continuation of application No. 12/473,171, filed on May 27, 2009, now abandoned.

(51) Int. Cl.

| | |
|---|---|
| *G06F 3/0482* | (2013.01) |
| *G06F 3/04842* | (2022.01) |
| *G06F 16/9535* | (2019.01) |
| *G06F 16/9537* | (2019.01) |
| *G06F 21/31* | (2013.01) |
| *G06T 11/00* | (2006.01) |
| *H04L 67/131* | (2022.01) |
| *H04L 67/52* | (2022.01) |
| *H04L 69/28* | (2022.01) |
| *H04W 4/029* | (2018.01) |
| *A63F 13/216* | (2014.01) |
| *A63F 13/65* | (2014.01) |
| *H04W 4/02* | (2018.01) |

(52) U.S. Cl.
CPC ...... *G06F 3/04842* (2013.01); *G06F 16/9535* (2019.01); *G06F 16/9537* (2019.01); *G06F 21/31* (2013.01); *G06T 11/00* (2013.01); *H04L 67/131* (2022.05); *H04L 67/52* (2022.05); *H04L 69/28* (2013.01); *H04W 4/029* (2018.02); *A63F 13/216* (2014.09); *A63F 13/65* (2014.09); *A63F 2300/205* (2013.01); *A63F 2300/6009* (2013.01); *A63F 2300/69* (2013.01); *A63F 2300/8082* (2013.01); *G06F 2221/2111* (2013.01); *H04W 4/027* (2013.01)

(58) Field of Classification Search
CPC ................ A63F 13/69; A63F 2300/205; A63F 2300/6009; H04L 63/102; H04L 67/52; H04W 4/029; G06F 16/9535; G06F 16/9537
See application file for complete search history.

(56) References Cited

U.S. PATENT DOCUMENTS

| | | | |
|---|---|---|---|
| 5,009,598 A | 4/1991 | Bennington |
| 5,260,697 A | 11/1993 | Barrett et al. |
| 5,415,549 A | 5/1995 | Logg |
| 5,450,590 A | 9/1995 | Elko et al. |
| 5,579,250 A | 11/1996 | Balaji et al. |
| 5,600,777 A | 2/1997 | Wang et al. |
| 5,604,907 A | 2/1997 | Conner et al. |
| 5,616,030 A | 4/1997 | Watson |
| 5,623,657 A | 4/1997 | Conner et al. |
| 5,990,935 A | 11/1999 | Rohlfing |
| 6,023,270 A | 2/2000 | Bruch et al. |
| 6,028,593 A | 2/2000 | Rosenberg et al. |
| 6,050,898 A | 4/2000 | Vange et al. |
| 6,080,063 A | 6/2000 | Khosla |
| 6,219,032 B1 | 4/2001 | Rosenberg et al. |
| 6,241,609 B1 | 6/2001 | Rutgers |
| 6,292,798 B1 | 9/2001 | Dockter et al. |
| 6,302,941 B1 | 10/2001 | Oya et al. |
| 6,314,167 B1 | 11/2001 | Johnson |
| 6,421,047 B1 | 7/2002 | De Groot |
| 6,424,410 B1 | 7/2002 | Pelosi |
| 6,529,210 B1 | 3/2003 | Rees |
| 6,532,021 B1 | 3/2003 | Tognazzini et al. |
| 6,549,893 B1 | 4/2003 | Lannert et al. |
| 6,572,380 B1 | 6/2003 | Buckley et al. |
| 6,677,858 B1 | 1/2004 | Faris et al. |
| 6,680,909 B1 | 1/2004 | Bansal et al. |
| 6,721,706 B1 | 4/2004 | Strubbe et al. |

| | | | | |
|---|---|---|---|---|
| 6,842,175 B1 | 1/2005 | Schmalstieg et al. | | |
| 6,983,232 B2 | 1/2006 | Nguyen et al. | | |
| 7,054,848 B1 | 5/2006 | Lannert et al. | | |
| 7,065,553 B1 | 6/2006 | Chesley et al. | | |
| 7,072,919 B2 | 7/2006 | Sexton et al. | | |
| 7,155,496 B2 | 12/2006 | Froyd et al. | | |
| 7,173,604 B2 | 2/2007 | Marvit et al. | | |
| 7,289,130 B1 | 10/2007 | Satoh et al. | | |
| 7,301,547 B2 | 11/2007 | Martins et al. | | |
| 7,313,402 B1 | 12/2007 | Rahman | | |
| 7,347,780 B1 * | 3/2008 | Best ........................ | A63F 13/52 |
| | | | | 463/31 |
| 7,349,840 B2 | 3/2008 | Budzinski | | |
| 7,353,160 B2 | 4/2008 | Voigt | | |
| 7,445,549 B1 * | 11/2008 | Best ........................ | A63F 13/12 |
| | | | | 463/31 |
| 7,487,177 B2 | 2/2009 | Kilian-Kehr et al. | | |
| 7,516,052 B2 | 4/2009 | Hatcherson et al. | | |
| 7,543,238 B2 | 6/2009 | Alcazar et al. | | |
| 7,546,225 B2 | 6/2009 | Nguyen et al. | | |
| 7,555,725 B2 | 6/2009 | Abramson et al. | | |
| 7,570,261 B1 | 8/2009 | Edecker et al. | | |
| 7,620,496 B2 | 11/2009 | Rasmussen | | |
| 7,643,673 B2 * | 1/2010 | Rohlf .................. | G06F 16/9537 |
| | | | | 382/285 |
| 7,685,508 B2 | 3/2010 | Froyd et al. | | |
| 7,702,693 B1 | 4/2010 | Aiyagari et al. | | |
| 7,710,418 B2 | 5/2010 | Fairclough | | |
| 7,739,479 B2 | 6/2010 | Bordes et al. | | |
| 7,797,168 B2 | 9/2010 | Kusumoto et al. | | |
| 7,824,268 B2 | 11/2010 | Harvey et al. | | |
| 7,831,932 B2 | 11/2010 | Josephsoon et al. | | |
| 7,859,551 B2 | 12/2010 | Bulman et al. | | |
| 7,890,419 B2 | 2/2011 | Jung et al. | | |
| 7,904,194 B2 | 3/2011 | Brown et al. | | |
| 7,933,929 B1 * | 4/2011 | McClendon ............ | G06T 17/05 |
| | | | | 707/802 |
| 7,955,168 B2 | 6/2011 | Mendelsohn et al. | | |
| 7,991,706 B2 | 8/2011 | Mattern | | |
| 7,996,264 B2 | 8/2011 | Kusumoto et al. | | |
| 8,041,664 B1 | 10/2011 | Lambert | | |
| 8,046,338 B2 | 10/2011 | Basso et al. | | |
| 8,060,257 B2 | 11/2011 | Close et al. | | |
| 8,094,834 B1 | 1/2012 | Brungart | | |
| 8,113,517 B2 | 2/2012 | Canterbury et al. | | |
| 8,138,930 B1 | 3/2012 | Heath | | |
| 8,181,152 B2 | 5/2012 | Choi et al. | | |
| 8,191,121 B2 | 5/2012 | Ruppert et al. | | |
| 8,192,283 B2 | 6/2012 | Ruppert et al. | | |
| 8,201,229 B2 | 6/2012 | Ruppert et al. | | |
| 8,205,092 B2 | 6/2012 | Stokes | | |
| 8,246,467 B2 | 8/2012 | Huang et al. | | |
| 8,279,862 B2 | 10/2012 | Sbisa et al. | | |
| 8,287,383 B1 | 10/2012 | Etter et al. | | |
| 8,303,387 B2 | 11/2012 | Spivack | | |
| 8,307,273 B2 | 11/2012 | Pea et al. | | |
| 8,316,237 B1 | 11/2012 | Felsher et al. | | |
| 8,532,340 B2 | 9/2013 | Kruglick | | |
| 8,566,786 B2 | 10/2013 | Choi et al. | | |
| 8,610,771 B2 | 12/2013 | Leung et al. | | |
| 8,615,383 B2 | 12/2013 | Dobbins et al. | | |
| 8,630,620 B2 | 1/2014 | Cha et al. | | |
| 8,639,629 B1 | 1/2014 | Hoffman | | |
| 8,660,679 B2 | 2/2014 | Kurabayashi et al. | | |
| 8,682,879 B2 | 3/2014 | Kim et al. | | |
| 8,719,077 B2 | 5/2014 | Titus et al. | | |
| 8,745,494 B2 | 6/2014 | Spivack | | |
| 8,768,838 B1 | 7/2014 | Hoffman | | |
| 8,797,352 B2 | 8/2014 | Lefevre et al. | | |
| 8,805,110 B2 | 8/2014 | Rhoads et al. | | |
| 8,947,455 B2 | 2/2015 | Friesen | | |
| 8,947,456 B2 | 2/2015 | Chen et al. | | |
| 8,957,835 B2 | 2/2015 | Hoellwarth | | |
| 8,970,690 B2 | 3/2015 | Meier et al. | | |
| 9,001,252 B2 | 4/2015 | Hannaford | | |
| 9,031,809 B1 | 5/2015 | Kumar et al. | | |
| 9,047,700 B2 | 6/2015 | Ur | | |
| 9,077,771 B2 | 7/2015 | Kruglick | | |
| 9,094,632 B2 | 7/2015 | Xuan | | |

(56) References Cited

U.S. PATENT DOCUMENTS

| | | | |
|---|---|---|---|
| 9,100,249 B2 | 8/2015 | Koster et al. | |
| 9,105,207 B2 | 8/2015 | Leung | |
| 9,196,094 B2 | 11/2015 | Ur | |
| 9,215,530 B2 | 12/2015 | Kurabayashi et al. | |
| 9,257,089 B2 | 2/2016 | Ur | |
| 9,280,853 B2 | 3/2016 | Ur | |
| 9,390,503 B2 | 7/2016 | Leung et al. | |
| 9,403,087 B2 | 8/2016 | Riley | |
| 9,486,707 B2 | 11/2016 | Kruglick | |
| 9,600,306 B2 | 3/2017 | Hamilton, II et al. | |
| 9,609,383 B1 | 3/2017 | Hirst | |
| 9,662,582 B2 | 5/2017 | Mullen | |
| 9,804,672 B2 | 10/2017 | Anderson et al. | |
| 2001/0002126 A1* | 5/2001 | Rosenberg | A63F 13/285 |
| | | | 345/156 |
| 2001/0021667 A1 | 9/2001 | Fujimoto et al. | |
| 2001/0030658 A1* | 10/2001 | Rosenberg | G06F 3/011 |
| | | | 715/701 |
| 2001/0044858 A1* | 11/2001 | Rekimoto | G06F 3/011 |
| | | | 710/1 |
| 2001/0053968 A1 | 12/2001 | Galitsky et al. | |
| 2002/0010734 A1 | 1/2002 | Ebersole et al. | |
| 2002/0021283 A1* | 2/2002 | Rosenberg | G06F 3/016 |
| | | | 345/156 |
| 2002/0029298 A1 | 3/2002 | Wilson | |
| 2002/0042921 A1 | 4/2002 | Ellis | |
| 2002/0057340 A1 | 5/2002 | Fernandez et al. | |
| 2002/0133325 A1 | 9/2002 | Hoare et al. | |
| 2002/0184516 A1 | 12/2002 | Hale et al. | |
| 2003/0016207 A1* | 1/2003 | Tremblay | G06F 3/0484 |
| | | | 345/156 |
| 2003/0064712 A1 | 4/2003 | Gaston et al. | |
| 2003/0179218 A1 | 9/2003 | Martins et al. | |
| 2003/0214530 A1 | 11/2003 | Wang et al. | |
| 2003/0217122 A1 | 11/2003 | Roese et al. | |
| 2003/0221022 A1 | 11/2003 | Sexton et al. | |
| 2003/0224855 A1 | 12/2003 | Cunningham | |
| 2004/0002843 A1 | 1/2004 | Robarts et al. | |
| 2004/0012542 A1 | 1/2004 | Bowsher et al. | |
| 2004/0024641 A1 | 2/2004 | Cartwright | |
| 2004/0027258 A1 | 2/2004 | Pechatnikov et al. | |
| 2004/0053686 A1 | 3/2004 | Pacey et al. | |
| 2004/0093122 A1 | 5/2004 | Galibraith | |
| 2004/0095311 A1 | 5/2004 | Tarton et al. | |
| 2004/0096806 A1 | 5/2004 | Davidsson et al. | |
| 2004/0158455 A1 | 8/2004 | Spivack et al. | |
| 2004/0248632 A1 | 12/2004 | French et al. | |
| 2005/0009608 A1 | 1/2005 | Robarts et al. | |
| 2005/0091019 A1 | 4/2005 | Clavadetscher | |
| 2005/0091118 A1 | 4/2005 | Fano | |
| 2005/0172018 A1 | 8/2005 | Devine et al. | |
| 2005/0212911 A1 | 9/2005 | Marvit et al. | |
| 2005/0219223 A1 | 10/2005 | Kotzin et al. | |
| 2005/0246275 A1 | 11/2005 | Nelson | |
| 2005/0264558 A1 | 12/2005 | Vesely et al. | |
| 2005/0267731 A1 | 12/2005 | Hatcherson et al. | |
| 2005/0268254 A1 | 12/2005 | Abramson et al. | |
| 2005/0278773 A1 | 12/2005 | Decinque et al. | |
| 2005/0286421 A1 | 12/2005 | Janacek | |
| 2006/0022048 A1* | 2/2006 | Johnson | G06Q 10/025 |
| | | | 707/E17.117 |
| 2006/0075885 A1 | 4/2006 | Bailey et al. | |
| 2006/0088276 A1 | 4/2006 | Cho et al. | |
| 2006/0092170 A1 | 5/2006 | Bathiche et al. | |
| 2006/0129682 A1 | 6/2006 | Hansen et al. | |
| 2006/0176303 A1 | 8/2006 | Fairclough | |
| 2006/0178968 A1 | 8/2006 | Jung et al. | |
| 2006/0189386 A1 | 8/2006 | Rosenberg | |
| 2006/0192852 A1 | 8/2006 | Rosenthal et al. | |
| 2006/0223635 A1 | 10/2006 | Rosenberg | |
| 2006/0223637 A1 | 10/2006 | Rosenberg | |
| 2006/0230073 A1 | 10/2006 | Gopalakrishnan | |
| 2006/0235674 A1 | 10/2006 | Voigt | |
| 2006/0287025 A1* | 12/2006 | French | A63F 13/843 |
| | | | 463/4 |
| 2006/0287815 A1 | 12/2006 | Gluck | |
| 2006/0293110 A1 | 12/2006 | Mendelsohn | |
| 2007/0003915 A1 | 1/2007 | Templeman | |
| 2007/0024644 A1 | 2/2007 | Bailey | |
| 2007/0062273 A1 | 3/2007 | Kalfayan et al. | |
| 2007/0097832 A1 | 5/2007 | Koivisto et al. | |
| 2007/0117576 A1 | 5/2007 | Huston | |
| 2007/0132785 A1* | 6/2007 | Ebersole | A63F 13/213 |
| | | | 345/633 |
| 2007/0165031 A1 | 7/2007 | Gilbert et al. | |
| 2007/0196809 A1 | 8/2007 | Sen | |
| 2007/0203903 A1 | 8/2007 | Attaran Rezaei et al. | |
| 2007/0214449 A1 | 9/2007 | Choi et al. | |
| 2007/0223675 A1 | 9/2007 | Surin et al. | |
| 2007/0260984 A1 | 11/2007 | Marks et al. | |
| 2007/0265089 A1 | 11/2007 | Robarts et al. | |
| 2007/0279494 A1 | 12/2007 | Aman et al. | |
| 2007/0281766 A1 | 12/2007 | Mullen | |
| 2007/0299559 A1 | 12/2007 | Janssen et al. | |
| 2008/0010106 A1 | 1/2008 | Bourne et al. | |
| 2008/0016545 A1 | 1/2008 | Decinque et al. | |
| 2008/0026838 A1 | 1/2008 | Dunstan et al. | |
| 2008/0031234 A1 | 2/2008 | Sbisa et al. | |
| 2008/0036653 A1 | 2/2008 | Huston | |
| 2008/0070696 A1 | 3/2008 | Kim et al. | |
| 2008/0071540 A1 | 3/2008 | Nakano et al. | |
| 2008/0133189 A1 | 6/2008 | Criswell et al. | |
| 2008/0146342 A1 | 6/2008 | Harvey et al. | |
| 2008/0162498 A1 | 7/2008 | Omoigui | |
| 2008/0162707 A1 | 7/2008 | Beck et al. | |
| 2008/0177650 A1 | 7/2008 | Jung et al. | |
| 2008/0182592 A1 | 7/2008 | Cha et al. | |
| 2008/0184138 A1 | 7/2008 | Krzanowski et al. | |
| 2008/0189360 A1 | 8/2008 | Kiley et al. | |
| 2008/0220397 A1 | 9/2008 | Capone et al. | |
| 2008/0222142 A1 | 9/2008 | O'Donnell | |
| 2008/0233550 A1 | 9/2008 | Solomon | |
| 2008/0247636 A1 | 10/2008 | Davis et al. | |
| 2008/0261564 A1 | 10/2008 | Logan | |
| 2008/0262911 A1* | 10/2008 | Altberg | G06Q 30/02 |
| | | | 715/757 |
| 2008/0294663 A1 | 11/2008 | Heinley et al. | |
| 2008/0320419 A1 | 12/2008 | Matas et al. | |
| 2009/0005018 A1 | 1/2009 | Forstall et al. | |
| 2009/0005140 A1 | 1/2009 | Rose et al. | |
| 2009/0005167 A1 | 1/2009 | Arrasvuori et al. | |
| 2009/0007229 A1 | 1/2009 | Stokes | |
| 2009/0010493 A1 | 1/2009 | Gornick et al. | |
| 2009/0019367 A1 | 1/2009 | Cavagnari et al. | |
| 2009/0024629 A1 | 1/2009 | Miyauchi | |
| 2009/0036186 A1 | 2/2009 | Benco et al. | |
| 2009/0043682 A1 | 2/2009 | Jung et al. | |
| 2009/0055246 A1 | 2/2009 | Jung et al. | |
| 2009/0061901 A1 | 3/2009 | Arrasvuori et al. | |
| 2009/0061974 A1 | 3/2009 | Lutnick et al. | |
| 2009/0069033 A1 | 3/2009 | Karstens et al. | |
| 2009/0070180 A1 | 3/2009 | Jung et al. | |
| 2009/0089825 A1 | 4/2009 | Coldwell | |
| 2009/0102616 A1 | 4/2009 | Stone et al. | |
| 2009/0102841 A1 | 4/2009 | Clavadetscher | |
| 2009/0125823 A1 | 5/2009 | Moll et al. | |
| 2009/0138355 A1 | 5/2009 | Jung et al. | |
| 2009/0144148 A1 | 6/2009 | Jung et al. | |
| 2009/0150802 A1 | 6/2009 | Do et al. | |
| 2009/0187389 A1 | 7/2009 | Dobbins et al. | |
| 2009/0199302 A1 | 8/2009 | So et al. | |
| 2009/0213114 A1 | 8/2009 | Dobbins et al. | |
| 2009/0237546 A1 | 9/2009 | Bloebaum et al. | |
| 2009/0254572 A1 | 10/2009 | Redlich et al. | |
| 2009/0262074 A1 | 10/2009 | Nasiri et al. | |
| 2009/0265257 A1 | 10/2009 | Klinger et al. | |
| 2009/0273559 A1* | 11/2009 | Rofougaran | A63F 13/212 |
| | | | 345/156 |
| 2009/0285407 A1 | 11/2009 | Cragun | |
| 2009/0291750 A1 | 11/2009 | Herrmann | |
| 2009/0293011 A1 | 11/2009 | Nassar | |
| 2009/0304283 A1 | 12/2009 | Predovic et al. | |

(56)  References Cited

U.S. PATENT DOCUMENTS

| | | |
|---|---|---|
| 2009/0307611 A1 | 12/2009 | Riley |
| 2010/0017820 A1 | 1/2010 | Thevathasan et al. |
| 2010/0030578 A1* | 2/2010 | Siddique ................ G06Q 20/12 |
| | | 705/26.1 |
| 2010/0045619 A1* | 2/2010 | Birnbaum ........... G06F 3/04845 |
| | | 345/173 |
| 2010/0050100 A1 | 2/2010 | Dettinger et al. |
| 2010/0095213 A1 | 4/2010 | Koster et al. |
| 2010/0125362 A1 | 5/2010 | Canora et al. |
| 2010/0131079 A1 | 5/2010 | Brown et al. |
| 2010/0131081 A1 | 5/2010 | Brown et al. |
| 2010/0134594 A1 | 6/2010 | Xuan |
| 2010/0161295 A1 | 6/2010 | Heil et al. |
| 2010/0199193 A1 | 8/2010 | Hamilton, II et al. |
| 2010/0217573 A1 | 8/2010 | Hatcherson et al. |
| 2010/0228776 A1 | 9/2010 | Melkote et al. |
| 2010/0250497 A1 | 9/2010 | Redlich et al. |
| 2010/0251185 A1 | 9/2010 | Pattenden |
| 2010/0260426 A1 | 10/2010 | Huang et al. |
| 2010/0261526 A1 | 10/2010 | Anderson et al. |
| 2010/0277468 A1 | 11/2010 | Lefevre et al. |
| 2010/0302143 A1 | 12/2010 | Spivack |
| 2010/0304804 A1 | 12/2010 | Spivack |
| 2010/0331041 A1 | 12/2010 | Liao et al. |
| 2011/0055049 A1 | 3/2011 | Harper et al. |
| 2011/0096136 A1 | 4/2011 | Liu et al. |
| 2011/0138317 A1 | 6/2011 | Kang et al. |
| 2011/0161872 A1 | 6/2011 | Abramson et al. |
| 2011/0184972 A1 | 7/2011 | Ard et al. |
| 2011/0213664 A1 | 9/2011 | Osterhout et al. |
| 2011/0214082 A1 | 9/2011 | Osterhout et al. |
| 2011/0225069 A1 | 9/2011 | Cramer et al. |
| 2011/0264494 A1 | 10/2011 | Lechowicz |
| 2011/0269520 A1 | 11/2011 | Amaitis et al. |
| 2012/0011142 A1 | 1/2012 | Baheti et al. |
| 2012/0019662 A1 | 1/2012 | Maltz |
| 2012/0038670 A1 | 2/2012 | Choi et al. |
| 2012/0050324 A1 | 3/2012 | Jeong et al. |
| 2012/0059720 A1 | 3/2012 | Musabji et al. |
| 2012/0062596 A1 | 3/2012 | Bedi et al. |
| 2012/0095853 A1 | 4/2012 | Von Bose et al. |
| 2012/0127062 A1 | 5/2012 | Bar-Zeev et al. |
| 2012/0143361 A1 | 6/2012 | Kurabayashi et al. |
| 2012/0174062 A1 | 7/2012 | Choi et al. |
| 2012/0229624 A1 | 9/2012 | Calman et al. |
| 2012/0230538 A1 | 9/2012 | Calman et al. |
| 2012/0239469 A1 | 9/2012 | Steinberg et al. |
| 2012/0249586 A1 | 10/2012 | Wither et al. |
| 2012/0253825 A1 | 10/2012 | Di Fabbrizio et al. |
| 2012/0323938 A1 | 12/2012 | Skeen et al. |
| 2012/0326966 A1 | 12/2012 | Rauber |
| 2013/0030903 A1 | 1/2013 | Spivack |
| 2013/0042296 A1 | 2/2013 | Hastings et al. |
| 2013/0050258 A1 | 2/2013 | Liu et al. |
| 2013/0093788 A1 | 4/2013 | Liu et al. |
| 2013/0106674 A1 | 5/2013 | Wheeler et al. |
| 2013/0145178 A1 | 6/2013 | Jeffries et al. |
| 2013/0147837 A1 | 6/2013 | Stroila |
| 2013/0154918 A1 | 6/2013 | Vaught et al. |
| 2013/0155105 A1 | 6/2013 | Boldyrev et al. |
| 2013/0174268 A1 | 7/2013 | Wang et al. |
| 2013/0179303 A1 | 7/2013 | Petrou et al. |
| 2013/0293580 A1 | 11/2013 | Spivack |
| 2013/0297460 A1 | 11/2013 | Spivack |
| 2014/0139610 A1 | 5/2014 | Weber et al. |
| 2014/0222558 A1 | 8/2014 | Spivack |
| 2014/0278847 A1 | 9/2014 | Gallo |
| 2014/0306866 A1 | 10/2014 | Miller et al. |
| 2015/0015459 A1 | 1/2015 | Cho et al. |
| 2015/0120533 A1 | 4/2015 | Jung et al. |
| 2015/0191595 A1 | 7/2015 | Sasse et al. |
| 2015/0302517 A1 | 10/2015 | Spivack |
| 2015/0350223 A1 | 12/2015 | Spivack |
| 2015/0367233 A1 | 12/2015 | Hicks et al. |
| 2016/0071326 A1 | 3/2016 | Spivack |
| 2016/0284232 A1 | 9/2016 | Sisamos |
| 2016/0299569 A1 | 10/2016 | Fisher et al. |
| 2019/0025905 A1 | 1/2019 | Godina et al. |
| 2019/0065027 A1* | 2/2019 | Hauenstein ........... G06F 3/0488 |
| 2019/0243444 A1 | 8/2019 | Wen et al. |
| 2019/0287308 A1 | 9/2019 | Luo et al. |
| 2020/0004401 A1* | 1/2020 | Hwang ............... G06F 3/04815 |
| 2020/0005026 A1* | 1/2020 | Andersen ............. A63F 13/428 |
| 2020/0005539 A1* | 1/2020 | Hwang .................. G06F 3/167 |
| 2020/0066032 A1 | 2/2020 | Li et al. |

FOREIGN PATENT DOCUMENTS

| | | | | |
|---|---|---|---|---|
| WO | 2009/002879 A1 | 12/2008 | | |
| WO | WO-2010009149 A2 * | 1/2010 | ......... | G06F 3/04886 |

OTHER PUBLICATIONS

Kaiser, E. Mutual disambiguation of 3 D multimodal interaction in augmented and virtual reality, Proceedings of the 5th international conference on multimodal interfaces (ICM).

Hughes, N., "Apple Envisions Interactive, Augmented Reality iPhone Multiplayer Games," http://appleinsider.com/ articles/10/11/2014, Nov. 4, 2010, 6 paqes.

International Search Report PCT/US2010/035282 dated Feb. 1, 2001; pp. 1-3.

Written Opinion PCT/US2010/035282 dated Feb. 1, 2011; pp. 1-6.

* cited by examiner

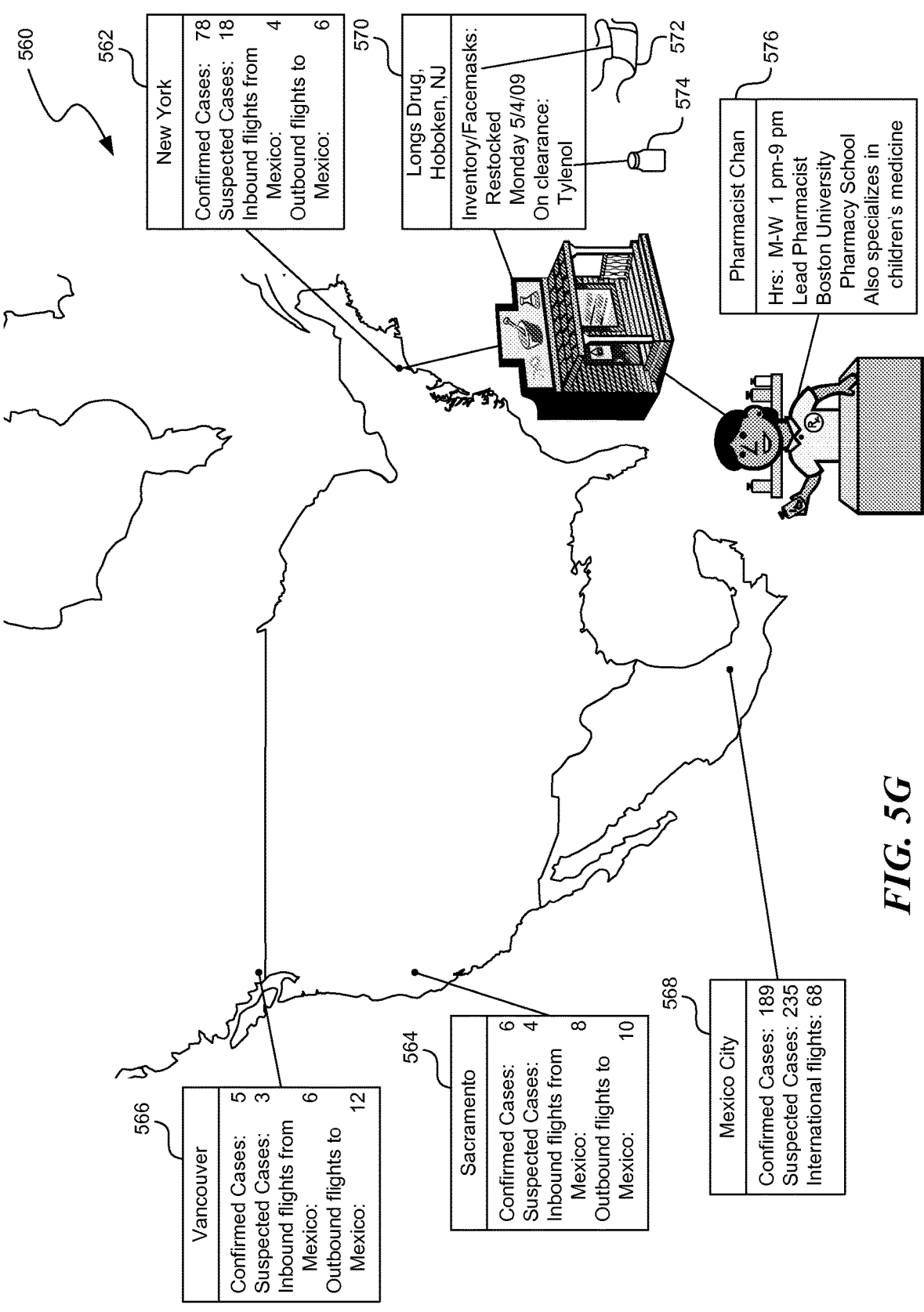

New York
Confirmed Cases: 78
Suspected Cases: 18
Inbound flights from Mexico: 4
Outbound flights to Mexico: 6

Longs Drug, Hoboken, NJ
Inventory/Facemasks: Restocked Monday 5/4/09
On clearance: Tylenol Pharmacist Chan
Hrs: M-W 1 pm-9 pm
Lead Pharmacist
Boston University Pharmacy School
Also specializes in children's medicine Vancouver
Confirmed Cases: 5
Suspected Cases: 3
Inbound flights from Mexico: 6
Outbound flights to Mexico: 12

Sacramento
Confirmed Cases: 6
Suspected Cases: 4
Inbound flights from Mexico: 8
Outbound flights to Mexico: 10

Mexico City
Confirmed Cases: 189
Suspected Cases: 235
International flights: 68

*FIG. 5G*

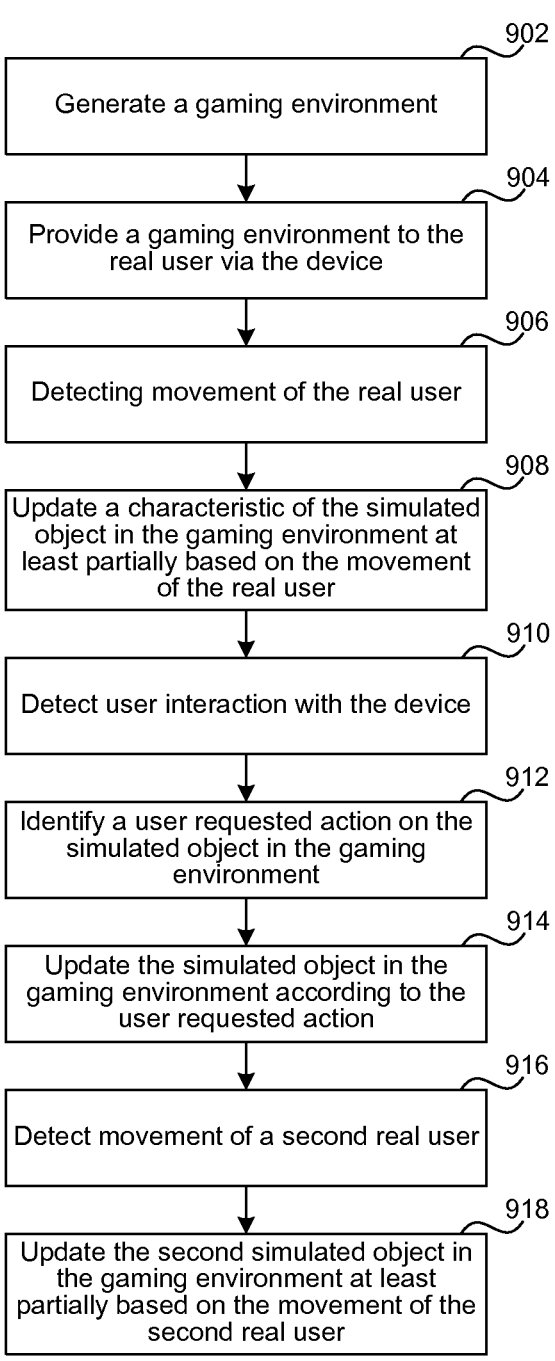

902
Generate a gaming environment

904
Provide a gaming environment to the real user via the device

906
Detecting movement of the real user

908
Update a characteristic of the simulated object in the gaming environment at least partially based on the movement of the real user 910
Detect user interaction with the device 912
Identify a user requested action on the simulated object in the gaming environment 914
Update the simulated object in the gaming environment according to the user requested action 916
Detect movement of a second real user 918
Update the second simulated object in the gaming environment at least partially based on the movement of the second real user

*FIG. 9*

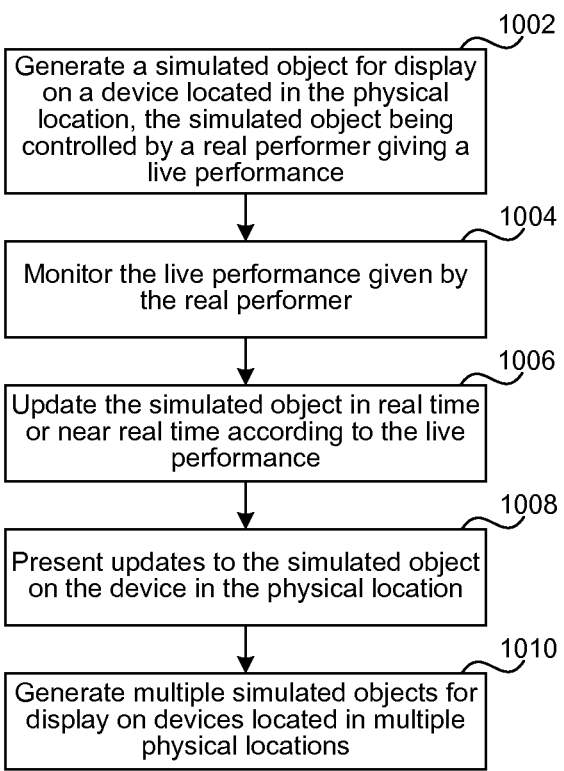

1002

Generate a simulated object for display on a device located in the physical location, the simulated object being controlled by a real performer giving a live performance

1004

Monitor the live performance given by the real performer

1006

Update the simulated object in real time or near real time according to the live performance

1008

Present updates to the simulated object on the device in the physical location

1010

Generate multiple simulated objects for display on devices located in multiple physical locations

*FIG. 10*

SYSTEM AND METHOD FOR FACILITATING USER INTERACTION WITH A SIMULATED OBJECT ASSOCIATED WITH A PHYSICAL LOCATION

CROSS-REFERENCE TO RELATED APPLICATIONS

This application is a continuation application of prior application Ser. No. 17/103,081, Filed on Nov. 24, 2020, which is a continuation application of prior application Ser. No. 14/826,123, filed on Aug. 13, 2015, which has issued as U.S. Pat. No. 10,855,683 on Dec. 1, 2020, which application is a continuation application of prior application Ser. No. 12/473,171 filed on May 27, 2009, the disclosure of each of which is incorporated by reference herein in its entirety.

TECHNICAL FIELD

This technology relates generally to virtual reality and in particular, to virtual realities representing and associated with a physical location and applications thereof.

BACKGROUND

Miniaturization of consumer electronics with sophisticated graphics capabilities and expansive computing power has augmented the activities one can engage in via consumer electronics and in particular, portable electronics such as cell phones, PDAs, Blackberries, iPhones, and the like.

Further, portable electronics or other electronics devices now generally include GPS or other types of location sensing capabilities. Thus, mobile application capabilities and user experiences can be enhanced with the awareness of location information, such as location data that includes the real time or current location of the user or the device.

BRIEF DESCRIPTION OF THE DRAWINGS

FIG. 5G illustrates a diagrammatic example of simulated objects that represent real-time or near-real time information/data projected onto geographical locations in a map.

FIG. 9 depicts a flow chart illustrating an example process for simulating a virtual game played by a real user in a real world environment.

FIG. 10 a flow chart illustrating an example process for simulating a virtual performance in a real world environment.

DETAILED DESCRIPTION

Figure 1:
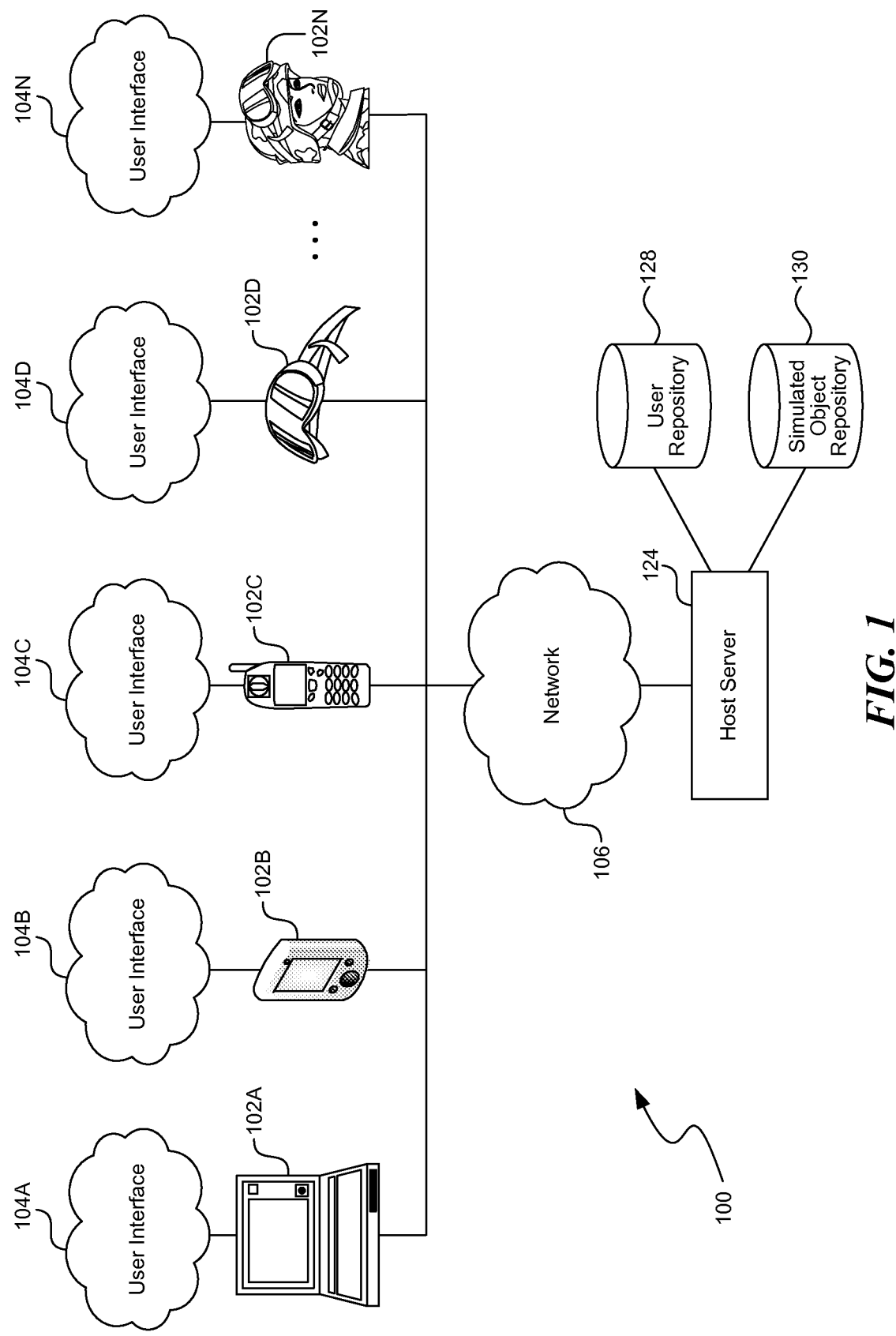
FIG. 1 illustrates an example block diagram of client devices able to communicate with a host server that generates and controls access to simulated objects through a network.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for facilitating user interaction with a simulated object that is associated with a physical location in the real world environment.

FIG. 1 illustrates an example block diagram of client devices 102A-N able to communicate with a host server 124 that generates and controls access to simulated objects through a network 106.

The client devices 102A-N can be any system and/or device, and/or any combination of devices/systems that is able to establish a connection with another device, a server and/or other systems. The client devices 102A-N typically include a display and/or other output functionalities to present information and data exchanged between among the devices 102A-N and the host server 124. For example, the client devices 102A-N can be any of, but are not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, an iPhone, cover headsets, heads-up displays, helmet mounted display, head-mounted display, scanned-beam display, wearable computer such as mobile enabled watches, and/or any other mobile interfaces and viewing devices, etc. The client devices 102A-N may be location-aware devices that are able to determine their own location or identify location information from an external source. In one embodiment, the client devices 102A-N are coupled to a network 106. In some embodiments, the devices 102A-N and host server 124 may be directly connected to one another.

In one embodiment, the host server 124 is operable to provide simulated objects (e.g., objects, computer-controlled objects, or simulated objects) that correspond to real world physical locations to be presented to users on client devices 102A-N. The simulated objects are typically software entities or occurrences that are controlled by computer programs and can be generated upon request when certain criteria are met. The host server 124 also processes interactions of simulated object with one another and actions on simulated objects caused by stimulus from a real user and/or the real world environment. Services and functions provided by the host server 124 and the components therein are described in detail with further references to the examples of FIG. 3A-3B.

The client devices 102A-N are generally operable to provide access (e.g., visible access, audible access) to the simulated objects to users, for example via user interface 104A-N displayed on the display units. The devices 102A-N may be able to detect simulated objects based on location and/or timing data and provide those objects authorized by the user for access via the devices. Services and functions provided by the client devices 102A-N and the components therein are described in detail with further references to the examples of FIG. 4A-4B.

The network 106, over which the client devices 102A-N and the host server 124 communicate, may be a telephonic network, an open network, such as the Internet, or a private network, such as an intranet and/or the extranet. For example, the Internet can provide file transfer, remote log in, email, news, RSS, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102A-N and the host server 124 and may appear as one or more networks to the serviced systems and devices. In one embodiment, communications to and from the client devices 102A-N can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more wireless networks, such as, but is not limited to, one or more of a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G networks, enhanced data rates for GSM evolution (EDGE), General packet radio service (GPRS), enhanced GPRS, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The host server 124 may include or be coupled to a user repository 128 and/or a simulated object repository 130. The user data repository 128 can store software, descriptive data, images, system information, drivers, and/or any other data item utilized by other components of the host server 124 and/or any other servers for operation. The user data repository 128 may be managed by a database management system (DBMS), for example but not limited to, Oracle, DB2, Microsoft Access, Microsoft SQL Server, PostgreSQL, MySQL, FileMaker, etc.

The user data repository 128 and/or the simulated object repository 130 can be implemented via object-oriented technology and/or via text files, and can be managed by a distributed database management system, an object-oriented database management system (OODBMS) (e.g., Concept-Base, FastDB Main Memory Database Management System, JDOlnstruments, ObjectDB, etc.), an object-relational database management system (ORDBMS) (e.g., Informix, OpenLink Virtuoso, VMDS, etc.), a file system, and/or any other convenient or known database management package.

In some embodiments, the host server 124 is able to provide data to be stored in the user data repository 128 and/or the simulated object repository 130 and/or can retrieve data stored in the user data repository 128 and/or the simulated object repository 130. The user data repository 128 can store user information, user preferences, access permissions associated with the users, device information, hardware information, etc. The simulated object repository 130 can store software entities (e.g., computer programs) that control simulated objects and the simulated environments in which they are presented for visual/audible access or control/manipulation. The simulated object repository 130 may further include simulated objects and their associated data structures with metadata defining the simulated object including its associated access permission.

Figure 2:
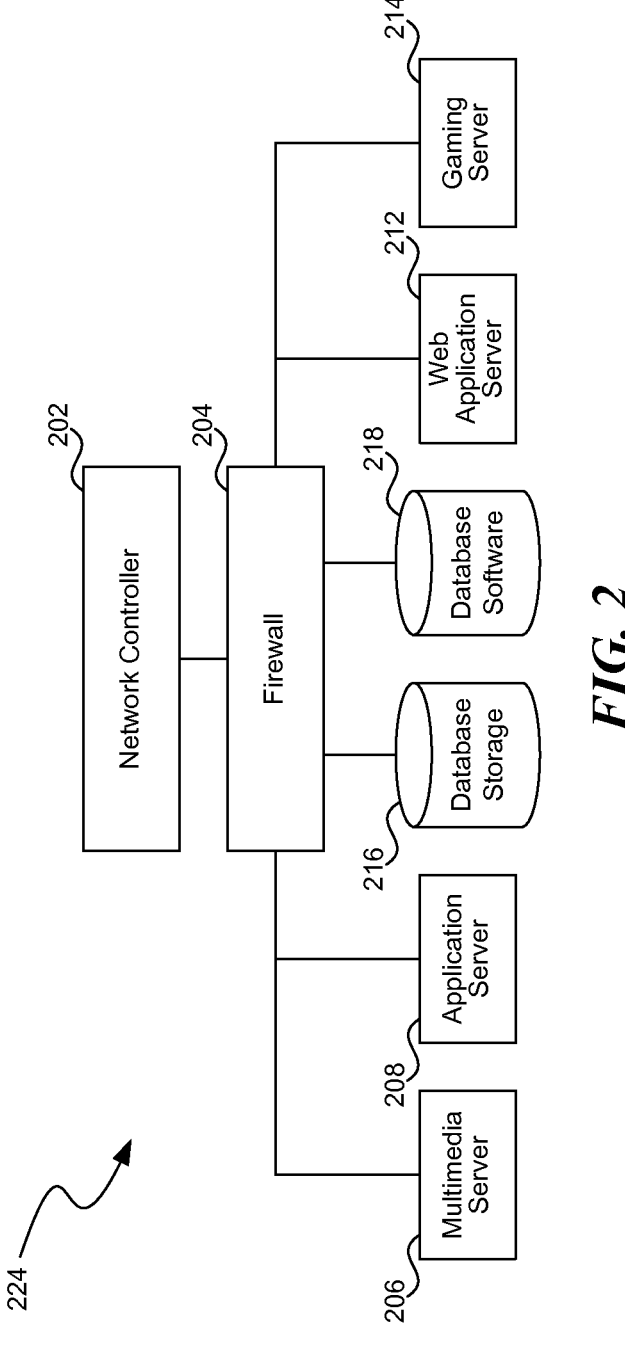
FIG. 2 depicts an example block diagram of the components of a host server that generates and controls simulated objects.

FIG. 2 depicts an example block diagram of the components of a host server 224 that generates and controls simulated objects.

In the example of FIG. 2, the host server 224 includes a network controller 202, a firewall 204, a multimedia server 206, an application server 208, a web application server 212, a gaming server 214, and a database including a database storage 216 and database software 218.

In the example of FIG. 2, the network controller 202 can be a networking device that enables the host server 224 to mediate data in a network with an entity that is external to the host server 224, through any known and/or convenient communications protocol supported by the host and the external entity. The network controller 202 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The firewall 204, can, in some embodiments, govern and/or manage permission to access/proxy data in a computer network, and track varying levels of trust between different machines and/or applications. The firewall 204 can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall 204 may additionally manage and/or have access to an access control list which details permissions including for example, the access and operation rights of an object by an individual, a machine, and/or an application, and the circumstances under which the permission rights stand.

Other network security functions can be performed or included in the functions of the firewall 204, can be, for example, but are not limited to, intrusion-prevention, intrusion detection, next-generation firewall, personal firewall, etc. without deviating from the novel art of this disclosure. In some embodiments, the functionalities of the network controller 202 and the firewall 204 are partially or wholly combined and the functions of which can be implemented in any combination of software and/or hardware, in part or in whole.

In the example of FIG. 2, the host server 200 includes the multimedia server 206 or a combination of multimedia servers to manage images, photographs, animation, video, audio content, graphical content, documents, and/or other types of multimedia data for use in or to supplement simulated content such as simulated objects and their associated deployment environment (e.g., a simulated environment). The multimedia server 206 is any software suitable for delivering messages to facilitate retrieval/transmission of multimedia data among servers to be provided to other components and/or systems of the host server 224, for example when rendering a web page, a simulated environment, and/or simulated objects including multimedia content.

In addition, the multimedia server 206 can facilitate transmission/receipt of streaming data such as streaming images, audio, and/or video. The multimedia server 206 can be configured separately or together with the web application server 212, depending on a desired scalability of the host server 224. Examples of graphics file formats that can be managed by the multimedia server 206 include but are not limited to, ADRG, ADRI, AI, GIF, IMA, GS, JPG, JP2, PNG, PSD, PSP, TIFF, and/or BMP, etc.

The application server 208 can be any combination of software agents and/or hardware modules for providing software applications to end users, external systems and/or devices. For example, the application server 208 provides specialized or generic software applications that manage simulated environments and objects to devices (e.g., client devices). The software applications provided by the application server 208 can be automatically downloaded on-demand on an as-needed basis or manually at the user's request. The software applications, for example, allow the devices to detect simulated objects based on the location of the device and to provide the simulated objects for access, based on permissions associated with the user and/or with the simulated object.

Additionally, nearby users or players can be also be automatically detected. The detected users/players can be represented on the user device for example, as a simulated object controlled by the nearby users/players. In addition, simulated objects having a particular set of temporal/spatial attributes may be detected by the user device. The simulated objects may or may not represent real-life users. The software applications provided by the application server 208 can be used by users to access, manipulate, and/or control simulated objects using their devices. Additional details related to the functions of the software applications are described with further reference to the example of FIG. 4A-B.

The application server 208 can also facilitate interaction and communication with the web application server 212, or with other related applications and/or systems. The application server 208 can in some instances, be wholly or partially functionally integrated with the web application server 212.

The web application server 212 can include any combination of software agents and/or hardware modules for accepting Hypertext Transfer Protocol (HTTP) requests from end users, external systems, and/or external client devices and responding to the request by providing the requestors with web pages, such as HTML documents and objects that can include static and/or dynamic content (e.g., via one or more supported interfaces, such as the Common Gateway Interface (CGI), Simple CGI (SCGI), PHP, Java-Server Pages (JSP), Active Server Pages (ASP), ASP.NET, etc.).

In addition, a secure connection, SSL and/or TLS can be established by the web application server 212. In some embodiments, the web application server 212 renders the user interfaces having the simulated environment as shown in the example screenshots of FIG. 5A-FIG. The user interfaces provided by the web application server 212 to client users/end devices provide the user interface screens 104A-104N for example, to be displayed on client devices 102A-102N. In some embodiments, the web application server 212 also performs an authentication process before responding to requests for access, control, and/or manipulation of simulated objects and simulated environments.

In one embodiment, the host server 200 includes a gaming server 214 including software agents and/or hardware modules for providing games and gaming software to client devices. The games and gaming environments typically include simulations of real world environments. The gaming server 214 also provides games and gaming environments such that the simulated objects provided therein have characteristics that are affected and can be manipulated by external stimuli (e.g., stimuli that occur in the real world environment) and can also interact with other simulated objects. External stimuli can include real physical motion of the user, motion of the device, user interaction with the simulated object on the device, and/or real world environmental factors, etc.

For example, the external stimuli detected at a client device may be converted to a signal and transmitted to the gaming server 214. The gaming server 214, based on the signal, updates the simulated object and/or the simulated environment such that a user of the client device perceives such changes to the simulated environment in response to real world stimulus. The gaming server 214 provides support for any type of single player or multiplayer electronic gaming, PC gaming, arcade gaming, and/or console gaming for portable devices or non-portable devices. These games typically have real world location correlated features and may have time or user constraints on accessibility, availability, and/or functionality. The objects simulated by the gaming server 214 are presented to users via devices and can be controlled and/or manipulated by authorized users.

The databases 216, 218 can store software, descriptive data, images, system information, drivers, and/or any other data item utilized by other components of the host server for operation. The databases 216, 218 may be managed by a database management system (DBMS), for example but not limited to, Oracle, DB2, Microsoft Access, Microsoft SQL Server, PostgreSQL, MySQL, FileMaker, etc. The databases 216, 218 can be implemented via object-oriented technology and/or via text files, and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package.

In the example of FIG. 2, the host server 200 includes components (e.g., a network controller, a firewall, a storage server, an application server, a web application server, a gaming server, and/or a database including a database storage and database software, etc.) coupled to one another and each component is illustrated as being individual and distinct. However, in some embodiments, some or all of the components, and/or the functions represented by each of the components can be combined in any convenient or known manner. Furthermore, the functions represented by the devices can be implemented individually or in any combination thereof, in hardware, software, or a combination of hardware and software.

Figure 3A:
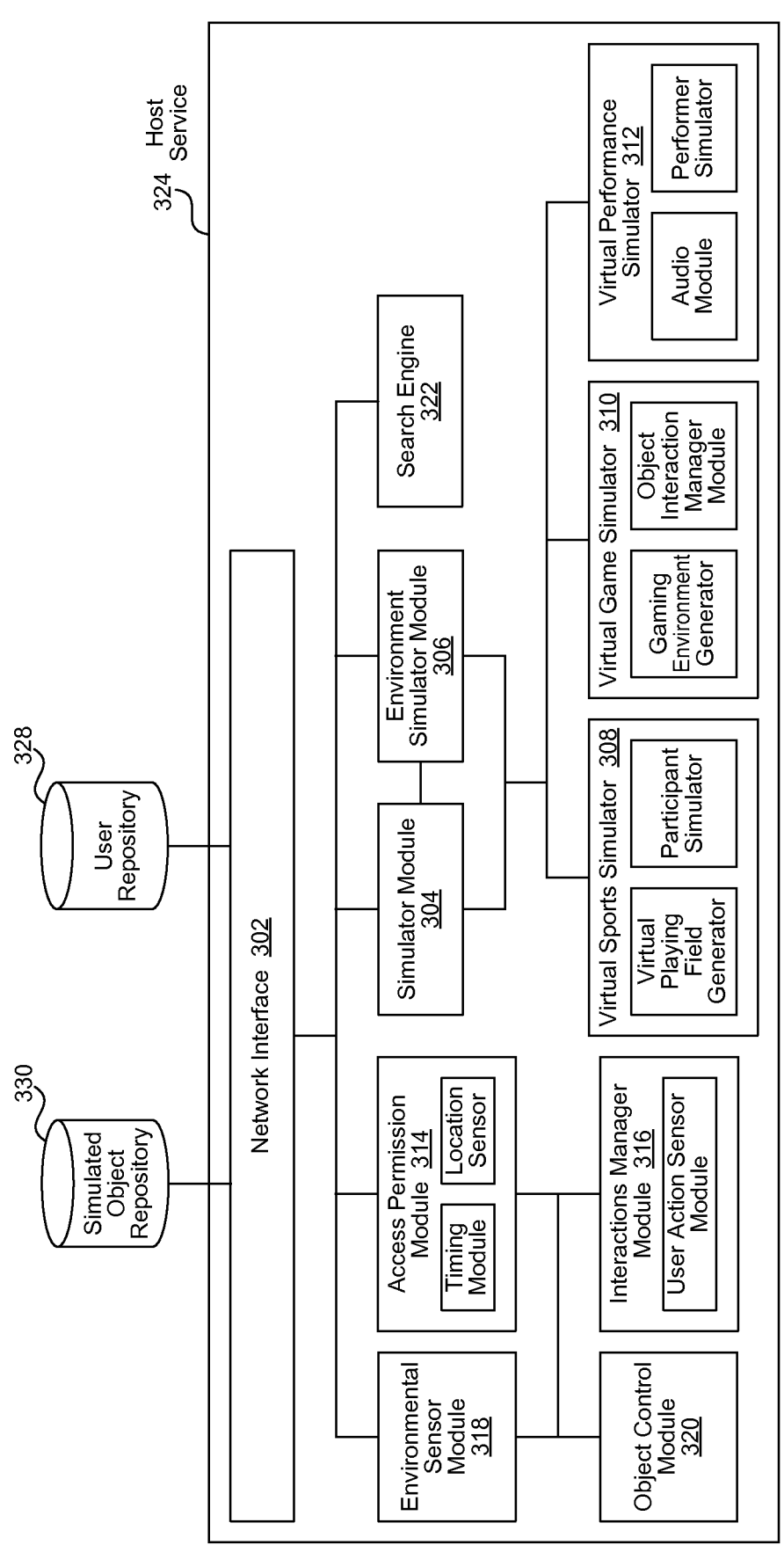
FIG. 3A depicts an example functional block diagram of the host server that generates and controls access to simulated objects.

FIG. 3A depicts an example functional block diagram of the host server 324 that generates and controls access to simulated objects.

The host server 324 includes a network interface 302, a simulator module 304, an environment simulator module 306, a virtual sports simulator 308, a virtual game simulator 310, a virtual performance simulator 312, an access permission module 314, an interactions manager module 316, an environmental factor sensor module 318, an object control module 320, and/or a search engine 322. In one embodiment, the host server 224 is coupled to a user data repository 328 and/or a simulated object repository 330. The user data repository 328 and simulated object repository 330 are described with further reference to the example of FIG. 1.

Additional or less modules can be included without deviating from the novel art of this disclosure. In addition, each module in the example of FIG. 3A can include any number and combination of sub-modules, and systems, implemented with any combination of hardware and/or software modules.

The host server 324, although illustrated as comprised of distributed components (physically distributed and/or functionally distributed), could be implemented as a collective element. In some embodiments, some or all of the modules, and/or the functions represented by each of the modules can be combined in any convenient or known manner. Furthermore, the functions represented by the modules can be implemented individually or in any combination thereof, partially or wholly, in hardware, software, or a combination of hardware and software.

In the example of FIG. 3A, the network interface 302 can be a networking device that enables the host server 324 to mediate data in a network with an entity that is external to the host server, through any known and/or convenient communications protocol supported by the host and the external entity. The network interface 302 can include one or more of a network adaptor card, a wireless network interface card, a router, an access point, a wireless router, a switch, a multi-layer switch, a protocol converter, a gateway, a bridge, bridge router, a hub, a digital media receiver, and/or a repeater.

One embodiment of the host server 324 includes a simulator module 304. The simulator module 304 can be any combination of software agents and/or hardware modules able to create, generate, modify, update, adjust, edit, and/or delete a simulated object.

A simulated object (or, otherwise referred as, a software object, a computer-controlled object, a simulated object, an object, etc.) typically refers to a software entity/software controlled entity that is controlled by a computer program. A simulated object can include a simulation of a physical entity, a concept/idea, an imaginary entity, a software object, an occurrence, an event, a living object, an inanimate object, and/or a real or imaginary phenomenon/object with strong, partial, or no resemblance to the physical appearances, observable properties of these entities. Simulated objects can be provided for or deployed in various types of simulated environments also controlled/managed by software.

Characteristics and attributes of simulated objects can be perceived by users in reality via a physical device (e.g., a client device or device 102 in the example of FIG. 1). For example, a simulated object typically includes visible and/or audible characteristics that can be perceived by users via a device with a display and/or a speaker. Changes to characteristics and attributes of simulated objects can also be perceived by users in reality via physical devices.

In one embodiment, these simulated objects are associated with physical locations in the real world environment and have associated accessibilities based on a spatial parameter (e.g., the location of a device through which the simulated object is to be accessed). In some instances, the simulated objects have associated accessibilities based on a temporal parameter as well as user-specificities (e.g., certain users may be different access rights to different simulated objects).

Objects may be simulated by the simulator module 304 automatically or manually based on a user request. For example, objects may be simulated automatically when certain criterion (e.g., qualifying location data and/or qualifying timing data) are met or upon request by an application. Objects may also be newly created/simulated when an authorized user requests objects that are not yet available (e.g., object is not stored in the simulated object repository 330). Generated objects can be stored in the simulated object repository 330 for future use.

In one embodiment, the simulated object is implemented using a data structure having metadata. The metadata can include a computer program that controls the actions/behavior/properties of the simulated object and how behaviors of the simulated object are affected by a user or other external factors (e.g., real world environmental factors). The metadata can also include location and/or timing parameters that include the qualifying parameters (e.g., qualifying timing and/or location data) that satisfy one or more criteria for access of the simulated object to be enabled. The location data can be specified with longitude and latitude coordinates, GPS coordinates, and/or relative position. In one embodiment, the object is associated with a unique identifier. The unique identifier may be further associated with a location data structure having a set of location data that includes the qualifying location data for the simulated object.

The metadata can include different criteria for different types of access of the simulated object. The different types of accessibility can include, create, read, view, write, modify, edit, delete, manipulate, and/or control etc. Each of these actions can be associated with a different criterion that is specified in the object's metadata. In addition to having temporal and spatial parameters, some criterion may also include user-dependent parameters. For example, certain users have edit right where other users only have read/viewing rights. These rights may be stored as user access permissions associated with the user or stored as object access permission rights associated with the simulated object. In one embodiment, the metadata includes a link to another simulated object and/or data from an external source (e.g., the Internet, Web, a database, etc.). The link may be a semantic link.

One embodiment of the host server 324 includes an environment simulator module 306. The environment simulator module 306 can be any combination of software agents and/or hardware modules able to generate, modify, update, adjust, and/or delete a simulated environment in which simulated objects are presented.

In one embodiment, the simulated environment is associated with a physical location in the real world environment. The simulated environment thus may include characteristics that correspond to the physical characteristics of the associated physical location. One embodiment of the host server 224 includes the environment simulator module 306 which may be coupled to the simulator module 304 and can render simulated environments in which the simulated object is deployed.

The simulated objects are typically visually provided in the simulated environment for display on a device display. Note that the simulated environment can include various types of environments including but not limited to, a gaming environment, a virtual sports environment, a virtual performance environment, a virtual teaching environment, a virtual indoors/outdoors environment, a virtual underwater environment, a virtual airborne environment, a virtual emergency environment, a virtual working environment, and/or a virtual tour environment.

For example, in a simulated environment with a virtual concert that is visible to the user using a device, the simulated objects in the virtual concert may include those controlled by a real musician (e.g. recorded or in real time). Other simulated objects in the virtual concert may further include simulated instruments with audible characteristics such as sound played by the real instruments that are represented by the simulated instruments. Additional simulated objects may be provided in the virtual concert for decorative purposes and/or to provide the feeling that one is in a real concert. For example, additional simulated objects may include a simulated audience, a simulated applause, etc.

In one example, the simulated environment is associated with a physical location that is a tourist location in the real world environment. The simulated object associated with the tourist location can include video and audio data about the tourist location. The audio data can include commentary about the historical value of the site. The simulated object may also include a link to other simulated objects corresponding to other nearby tourist attractions or sites and serve as a self-serve travel guide or personal travel agent.

In one embodiment, this information is automatically provided to the user when he or she arrives at or near the real world tourist location (e.g., implicit request) via the device. Alternatively, the information is provided upon request by the user (e.g., explicit request). For example, simulated objects associated with various attractions in the tourist location in the real world can be selected by the user (e.g., via input to the device). The simulated objects that are selected may perform playback of the textual, video and/or audio data about the attractions in the real world tourist location.

In one example, the simulated object is an advertisement (e.g., an electronic advertisement) and the user to whom the simulated object is presented is a qualified user targeted by the advertisement. The user may qualify on a basis of a location, identity, and/or a timing parameter. For example, the user may be provided with advertisements of local pizza shops or other late night dining options when the user is driving around town during late night hours when other dining options may not be available.

In one example, the simulated environment is used for education and training of emergency services providers and/or law enforcement individuals. These simulated environments may include virtual drills with simulated objects that represent medical emergencies or hostages. The users that access these simulated virtual drills may include medical service providers, firefighters, and/or law enforcers.

In a further example, simulated objects can represent electronic documents (e.g., files or datasets) that are visible using the device when the device is in a particular physical location in the real world environment. For example, a document or note can be left for a user at a simulated location that corresponds to a real world location. In one embodiment, the simulated object represents an electronic document and the user retrieves the electronic document using the device when the location of the device satisfies a criteria. For example, the electronic document is a reference manual for a physical object and can be accessible to the user when the location of the device is within a range of the physical object.

In another example, simulated objects with access permissions that on spatial and temporal parameters can be used to data protection. The simulated object that represents the protected data may only be viewed using devices located at an authorized location or in an authorized facility. The user viewing the protected data may also be an authorized user. Thus, the protected data cannot be viewed by anyone outside the authorized location/facility or by anyone that is not authorized. The protected data may only be viewed during a certain period of time.

In one example, the simulated environment is a virtual desktop that includes simulated objects. The simulated objects may be associated with real physical locations near a user and be placed in space relative to the user. In one embodiment, access to the simulated objects may be enabled for those associated with the real physical locations visible through an imaging unit of the device (e.g., a camera in a cell phone or PDA). For example, when a user views physical space with a camera on a cell phone, the user can see the simulated objects in the virtual desktop displayed on the cell phone. The virtual desktop appears to the user as if it is in the surrounding space and may include features that correspond to the real surrounding space. The device can be moved in space such that different simulated objects associated with different physical locations are imaged through the cell phone camera and thus accessed.

In another example, a simulated environment can be used for task management. For example, the simulated object can represent or include information related to a task. The simulated tasks can be presented to the user through the device when located at or near the location where the task is to be performed. For example, information about deliveries can be placed for a driver at various real world delivery locations. Thus, the driver can be notified of this information on their devices when they arrive at the delivery locations. The information more relevant to their present location can be displayed as more visible or prominent with higher priority in the user interface displayed on the device.

In one embodiment, the simulated object is a virtual personal assistant of the user. The virtual personal assistant can be pre-programmed or configured to follow the user around as they move around in real physical space. The virtual personal assistant may be visible to the user via the device anywhere they go. The virtual personal assistance may also be visible to others via devices with access permissions.

The simulated environment may be a virtual marketplace associated with the physical location in the real world environment. The simulated objects and represent either real goods or virtual goods for users to sell or purchase when the device is located in the physical location associated with the virtual market place. In general, users with a device with the appropriate software capabilities and/or proper access permissions can see the simulated objects and buy or sell the corresponding goods.

In one embodiment, the simulated object represents an electronic coupon and is accessible to a user using the device when the device is located at the location during a certain period of time that satisfies the criteria. The electronic coupon may be redeemed by the user at a business located at or near the location in the real world environment.

One embodiment of the host server 324 includes an access permission module 314. The access permission module 314 can be any combination of software agents and/or hardware modules able to determine availability and accessibility of a simulated object based on a criterion.

The criteria can include spatio-temporal criteria having a timing parameter and/or a location parameter. For example, a simulated object may be associated with a physical location in the real world environment. The location parameter may include a set of locations including the physical location and/or surrounding regions where the device is to be located to access the simulated object. In addition, the timing parameter includes a time or set of times when the simulated object can be accessed. The timing parameter and the location parameter can be used independently or in conjunction with each other.

The access permission module 314 can determine whether a location data and/or a timing data satisfy the criterion (e.g., a spatio-temporal criterion). The access permission module 314 is coupled to the simulator module 304, the environment simulator module 306, and the simulated object repository 330, where simulated objects and/or simulated environments are stored. When the access permission module 314 determines that the location and/or timing data satisfy the criterion, the access permission module 314 access of the simulated object in a simulated environment by a user via a device (e.g., portable or non-portable device). One embodiment of the access permission module 314 includes a timing module and a location sensor to determine the current time and/or the current location of a device.

In one embodiment, location data and/or the timing data that satisfy the criterion include the location of the device and the time the device is located at the location. The enable signal may be sent to the simulator and environmental simulator modules such that the simulator module 304 an enable access to the simulated object via a device when the criteria is met. The access permission module 314 may retrieve the relevant simulated objects and simulated environments from other modules to be provided to a user via a device.

In one embodiment, the access permission module 314 determines the criterion associated with the simulated objects, for example, by retrieving and/or identifying metadata stored in the data structure of the simulated object that specifies qualifying timing data and/or qualifying location data that satisfy the criteria for object access. In addition, the access permission module 314 can set the access criteria for a simulated object. For example, the access permission module 314 can identify metadata of the simulated object and determine various attributes of the simulated object to set some access criteria.

The access permission module 314 can also identify the user access permission associated with a particular user. For example, the access permission module 314 can retrieve user information from the user repository 328. The user repository can be coupled to the simulated object repository 330 and can have stored therein access permissions associated with the user. Thus, the criterion to access a simulated object can further include a user-dependent parameter.

One embodiment of the host server 324 includes an interactions manager module 316. The interactions manager module 316 can be any combination of software agents and/or hardware modules able to monitor, manage, control user interactions and user requested interactions with the simulated objects, and interactions among simulated objects.

The interactions manager module 316 can be coupled to the access permission module 314 to determine the criteria for interacting with the simulated objects and whether the requesting user has permission to perform such requested actions on the simulated objects. The interactions manager module 316, upon receiving a request from the user to perform a requested action on the simulated object, the manager module 316 determines whether the user is permitted to perform the requested action on the simulated object.

The interactions manager module 316 can identify this information according to either user access permissions and/or object access permissions. The requested action is typically triggered by the user via the device (e.g., portable device, location-aware device, PDA, cell phone, laptop, etc.) using input control (e.g., keyboard, mouse, joystick, pointing device, touch screen sensor, etc.) of the device.

If the user is permitted to interact with the simulated object, the manager module 316 can perform the requested action on the simulated object by updating stored attributes of the simulated objects and presenting the updated attributes via the device to be perceived by the user. In one embodiment, the simulator module 304 updates the attributes according to the requested action upon receiving the commands or signals. The user requested actions can include, by way of example but not limitation, collecting an item (e.g., a reward), firing ammunition, throwing an item, eating an item, attending an event, dialoguing with another character (real or virtual), surmounting a barrier, hitting a ball, blocking a ball, kicking a ball, and/or shooting a goblin, etc. These actions may be requested by the user using an input device or a combination of input devices.

Note that user actions requested with regards to simulated objects can be stored, for later access or to compute statistics regarding usage, likeability, user preference, etc. User actions requested pertaining to simulated objects an include one or more of, adding as a favorite and collecting as a bookmark, sharing the simulated object, flagging the simulated object, and/or tagging the simulated object. Additionally, user-generated data for simulated objects can also be recorded and stored. User-generated data an include, one or more of, modification of the simulated object, comment on the simulated object, review of the simulated object, and/or rating of the simulated object. In some embodiments, the user modifies the simulated object using the device or another device. In addition, the user can create or author the simulated object using any device.

Simulated objects may interact with one another. The interactions manager module 316 can control these interactions according to the computer programs that control the simulated objects. The simulated objects that interact with one another may be controlled/manipulated by real users and/or wholly/partially controlled by computer programs.

One embodiment of the host server 324 includes an environmental sensor module 318. The environmental sensor module 318 can be any combination of software agents and/or hardware modules able to detect, sense, monitor, identify, track, and/or process environmental factors, physical characteristics and changes that occur in the real world environment.

Since simulated environments can be sometimes thought not always generated to correspond to simulation of a physical location in a real world environment and/or regions proximal to the physical location, the environmental sensor module 318 can detect and sense the environmental factors and physical characteristics in the real world to facilitate such interactions. The environmental sensor module 318 is coupled to the environment simulator module 306 and can provide such information to the environmental simulator module 306 such that simulated environments, when generated, will correspond to simulation of the physical location and regions proximal to the physical location.

In one embodiment, simulated objects and their associated characteristics depend on stimuli that occur in the real world environment. For example, the external stimuli that can change/affect behaviors or appearances of a simulated object include environmental factors in or near the physical location associated with the simulated object. The environmental sensor module 318 can detect these environmental factors and changes and communicate the information to the simulator module 304 and/or the environmental simulator module 306 to implement the effects of the environmental factors on the simulated object in software for presentation via devices.

The environmental factors detected by the environmental sensor module 318 can include, by way of example but not limitation, temperature, weather, landscape, surrounding people, cars, animals, climate, altitude, topology, population, etc.

One embodiment of the host server 324 includes an object control module 320. The object control module 320 can be any combination of software agents and/or hardware modules able to manage the control of simulated objects by real users in the real world environment.

Simulated objects, in addition to being manipulated and interacted with by users, can also be "controlled" by users. In a simulated environment, there may be simulated objects some of which are controlled by different users in different physical locations, for example. Control of a simulated object by a user can be defined more broadly than manipulation of or interaction with a simulated object. For example, the movements, behaviors, and/or actions of a simulated object can be simulations of movement, behaviors, and/or actions of a real user.

The movement trajectory of the simulated object in a simulated environment, when controlled by a user, can be predominantly governed by movement or behavior of the user. In a further example, the form/shape of the simulated object may also depend on the physical appearances of the users. In addition, the simulated object may include audible characteristics that depend on the user's voice or speech.

The object control module 320 determines permissions of users to control the simulated object. Changes to attributes of the simulated object caused by user control can be reflected in the simulated environment and perceived by the same controlling user or other users via a device. This update can occur with a delay or in real-time/near real-time. In addition, other simulated objects may be controlled by other users (e.g., located in the same or different physical location) and the changes to attributes of the simulated object caused by control of another user is reflected in the simulated environment and perceived by the user or other users using one or more devices.

One embodiment of the host server 324 includes a virtual sports simulator 308. The virtual sports simulator 308 can be any combination of software agents and/or hardware modules able to simulate a virtual sports game that is played by a real participant in a real world environment.

The virtual sports simulator 308 is coupled to the simulator module 304 and the environment simulator module 306. In one embodiment, the virtual sports simulator 308 can generate a simulated playing field that represents a physical location in the real world environment. The simulated playing field generally has characteristics that correspond to the physical characteristics of the physical location where the real participant is located. For example, if the real participant is located in a real park, the simulated playing field may include a grass field with trees and benches. In addition, the size of the simulated playing field can be determined based on a size of the physical location. One embodiment of the virtual sports simulator 308 includes a virtual playing field generator.

The virtual sports game can be solo or team sports games. For example, the virtual sports game can be a simulation of virtual golf in a downtown square or a virtual baseball game on a crowded street corner. Even though the real street corner may not have enough room for an actual physical baseball game, the real participants can stand in various locations with their devices (e.g., mobile devices or location-aware devices) and the simulated playing field can automatically resize and readjust based on the size and other characteristics of the street corner in the real environment.

In one embodiment, the virtual sports simulator 308 identifies the user requested action to be performed on a simulated object in the simulated playing field by detecting user interaction with the device or by receiving data indicating the nature of the interaction of the requested action. In general, a simulated object in the simulated playing field includes a simulated ball with a type that depends on the type of sports of the virtual sports game. For example, the simulated ball may be a golf ball, a basketball, a baseball, a football, and/or a soccer ball. The user requested action is also typically an action to control the ball that depends on the type of sports that the virtual game is.

The virtual sports simulator 308 updating a characteristic of the simulated object in the simulated playing field according to the user requested action and can be presented via the device such that the updated characteristic of the simulated object is perceived by the user. The continuous or periodic updating of the simulated object and others provide the perception that a sporting event is occurring live. In any given virtual sports game, the simulated object (e.g., simulated ball) can be acted upon by multiple real participants. In addition, the virtual sports simulator 308 may provide additional simulated objects in the virtual sports game including but not limited to, a referee, a clock, virtual audiences, cheerleaders, living objects, animals, etc.

In one embodiment, the virtual sports simulator 308 provides a simulated participant in the simulated playing field. The simulated participant is typically programmed to act as a teammate or opponent of the real participant. In addition, the simulated participant performs actions on the simulated object. The actions also generally correspond to the type of game of the virtual sports game. One embodiment of the virtual sports simulator 308 includes a participant simulator.

The virtual sports game simulated by the virtual sports simulator 308 may also be a non-competitive sports game, such as, a hike, a scuba diving session, a snorkeling session, a surfing session, etc.

One embodiment of the host server 324 includes a virtual game simulator 310. The virtual game simulator 310 can be any combination of software agents and/or hardware modules able to simulate a virtual game that is played by a real participant in a real world environment. The virtual game simulator 310 may include the gaming environment generator and the object interaction manager module.

The virtual game simulator 310 is coupled to the simulator module 304 and the environment simulator module

306. Thus, the virtual game simulator 310 can communicate with the modules to retrieve the simulated objects and/or a gaming environment to be provided to a user. In addition the virtual game simulator 310 can generate the gaming environment to a real user via a device. In general, the gaming environment to correspond to a physical location in the real world environment where the real user is located. For example, the gaming environment can have characteristics that correspond to physical characteristics of the physical location.

In one embodiment, the gaming environment includes a set of simulated objects; the accessibility of which using a device can depend on timing, location, and/or user specific parameters. For example, accessibility of the simulated object via the device depends on a location of the device; accessibility can further depend on the time when the device is located at the location. The simulated objects can include by way of example but not limitation, reward items, ammunition, barriers, goblins, places, events, and other characters When a simulated object in the gaming environment is accessible to a real user via a device, the real user can control the simulated object in the gaming environment. In one embodiment, the virtual game simulator 310 detects the movement of the real user and updates a characteristic of the simulated object in the gaming environment at least partially based on the movement of the real user.

In one embodiment, the user requested action on the simulated object in the gaming environment can be identified by the virtual game simulator 310 detecting user interactions with the device. The virtual game simulator 310 can thus update the characteristic of the simulated object in the gaming environment according to the user requested action. The updates are typically presented through the device to be perceived by the user and/or additional other users participating in the virtual game.

In addition, the gaming environment can include additional simulated objects controlled by different real users. For example, another simulated object may be controlled by another real user and interacts with other simulated objects controlled by other real users in the gaming environment. Furthermore, the virtual game simulator 310 can detect the movement of another real user and updates the second simulated object in the gaming environment at least partially based on the movement of the second real user. In one embodiment, the gaming environment includes an arcade game or a strategy game. For example, the arcade game can be a Pacman game and the real user and the second real user control simulated objects representing Pacman. The gaming environment can also include other types of arcade games including but not limited to Centipede, Frogger, etc. The strategy games can include Chess, Checkers, and/or Othello, etc.

One embodiment of the host server 324 includes a virtual performance simulator 312. The virtual performance simulator 312 can be any combination of software agents and/or hardware modules able to simulate a virtual performance in a real world environment.

The virtual performance simulator 312 is coupled to the simulator module 304 and the environment simulator module 306. Thus, the virtual performance simulator 312 can communicate with the modules to retrieve the simulated objects and/or a virtual performance to be provided to a user.

In one embodiment, the virtual performance simulator 312 generates a simulated object that is controlled by a real performer for display on a device located in a physical location in the real world environment. The real performer may be giving a live performance in the real world environment and may not necessarily be located in the physical location where the simulated object is displayed on the device.

The virtual performance simulator 312 can update the simulated object in real time or near real time according to the live performance given by the real performer in the real world environment. The updates to the simulated object can be presented on the device in the physical location, after a delayed period of time or in real time/near real time. In one embodiment, the device is suitably sized to display a full-size adult human being such that the simulated object of the performer can be projected at a full size to provide the sensation of a real concert/performance.

The simulated object can be a simulated version of the real performer having characteristics similar to that of the real performer. For example, the simulated object may have visual characteristics and resemble those of the real performer. In addition, the simulated object may have audible characteristics that resemble those of the real performer. In one embodiment, the simulated object includes audio data that is generated by the real performer during the performance. The audio data may also include sound effects or background music generated in the live performance.

The live performance can be a concert where the real performer is a musician. The live performance may be a play where the real performer is an actor/actress. The live performance may be a presentation where the real performer is a presenter.

The virtual performance simulator 312 can generate multiple simulated objects for display on devices located in various physical locations in the real world environment. Each of the multiple simulated objects can represent the real performer giving the live performance such that the live performance is projected at each of the multiple physical locations in the real environment. This way, audiences, instead of having to travel to a concert, can view the simulated performance at a local or nearby location. One embodiment of the virtual performance simulator 312 includes an audio module and/or a performer simulator.

One embodiment of the host server 324 includes a search engine 322. The search engine 322 can be any combination of software agents and/or hardware modules able to search, detect, and/or identify simulated objects.

The search engine 322 can search or detect objects either automatically or in response to user request. For example, the user can request access to simulated objects and perform a search request. The search request parameters can include, one or more of, the user's location, the current time or a time period. The search that is performed can automatically detect all simulated objects that are available for access to the user. In one embodiment, the simulated objects are further filtered based on the permissions granted to the user and/or the access permissions associated with the simulated object.

The host server 324 represents any one or a portion of the functions described for the modules. More or less functions can be included, in whole or in part, without deviating from the novel art of the disclosure.

Figure 3B:
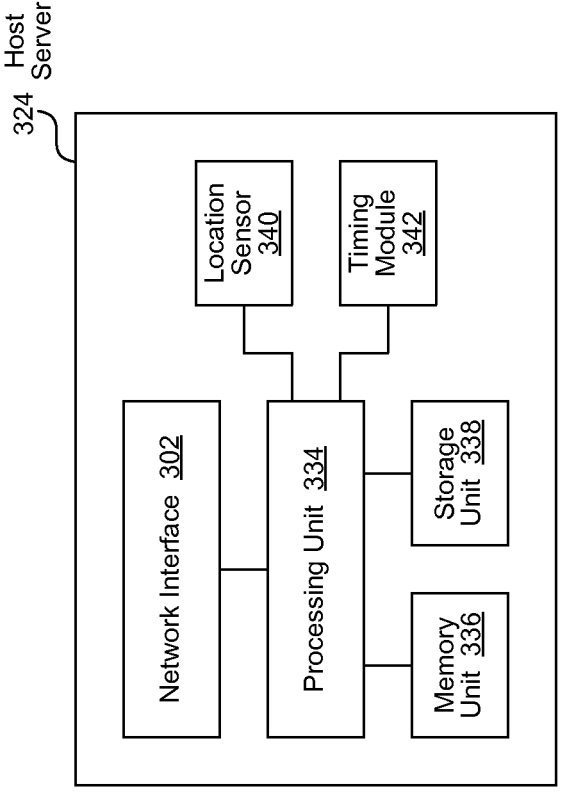
FIG. 3B depicts an example block diagram illustrating the components of the host server that generates and controls access to simulated objects.

FIG. 3B depicts an example block diagram illustrating the components of the host server 334 that generates and controls access to simulated objects.

In one embodiment, host server 334 includes a network interface 302, a processing unit 334, a memory unit 336, a storage unit 338, a location sensor 340, and/or a timing module 342. Additional or less units or modules may be included. The host server 334 can be any combination of hardware components and/or software agents for creating, manipulating, controlling, generating simulated objects and environments. The network interface 302 has been described in the example of FIG. 3A.

One embodiment of the host server 334 further includes a processing unit 334. The data received from the network interface 302, location sensor 340, and/or the timing module 342 can be input to a processing unit 334. The location sensor 340 can include GPS receivers, RF transceiver, an optical rangefinder, etc. The timing module 342 can include an internal clock, a connection to a time server (via NTP), an atomic clock, a GPS master clock, etc.

The processing unit 334 can include one or more processors, CPUs, microcontrollers, FPGAs, ASICs, DSPs, or any combination of the above. Data that is input to the host server 334 can be processed by the processing unit 334 and output to a display and/or output via a wired or wireless connection to an external device, such as a mobile phone, a portable device, a host or server computer by way of a communications component.

One embodiment of the host server 334 further includes a memory unit 336 and a storage unit 338. The memory unit 335 and a storage unit 338 are, in some embodiments, coupled to the processing unit 334. The memory unit can include volatile and/or non-volatile memory. In generating and controlling access to the simulated objects, the processing unit 334 may perform one or more processes related to generating simulated objects and/or controlling access to simulated objects.

In some embodiments, any portion of or all of the functions described of the various example modules in the host server 324 of the example of FIG. 3A can be performed by the processing unit 334. In particular, with reference to the host server illustrated in FIG. 3A, the object simulator, environment simulator, access permissions functions, interactions manager functions, environmental sensing functions, object control functions, virtual sports simulator, virtual game simulator, and/or virtual performance simulator can be performed via any of the combinations of modules in the control subsystem that are not illustrated, including, but not limited to, the processing unit 334 and/or the memory unit 336.

Figure 4A:
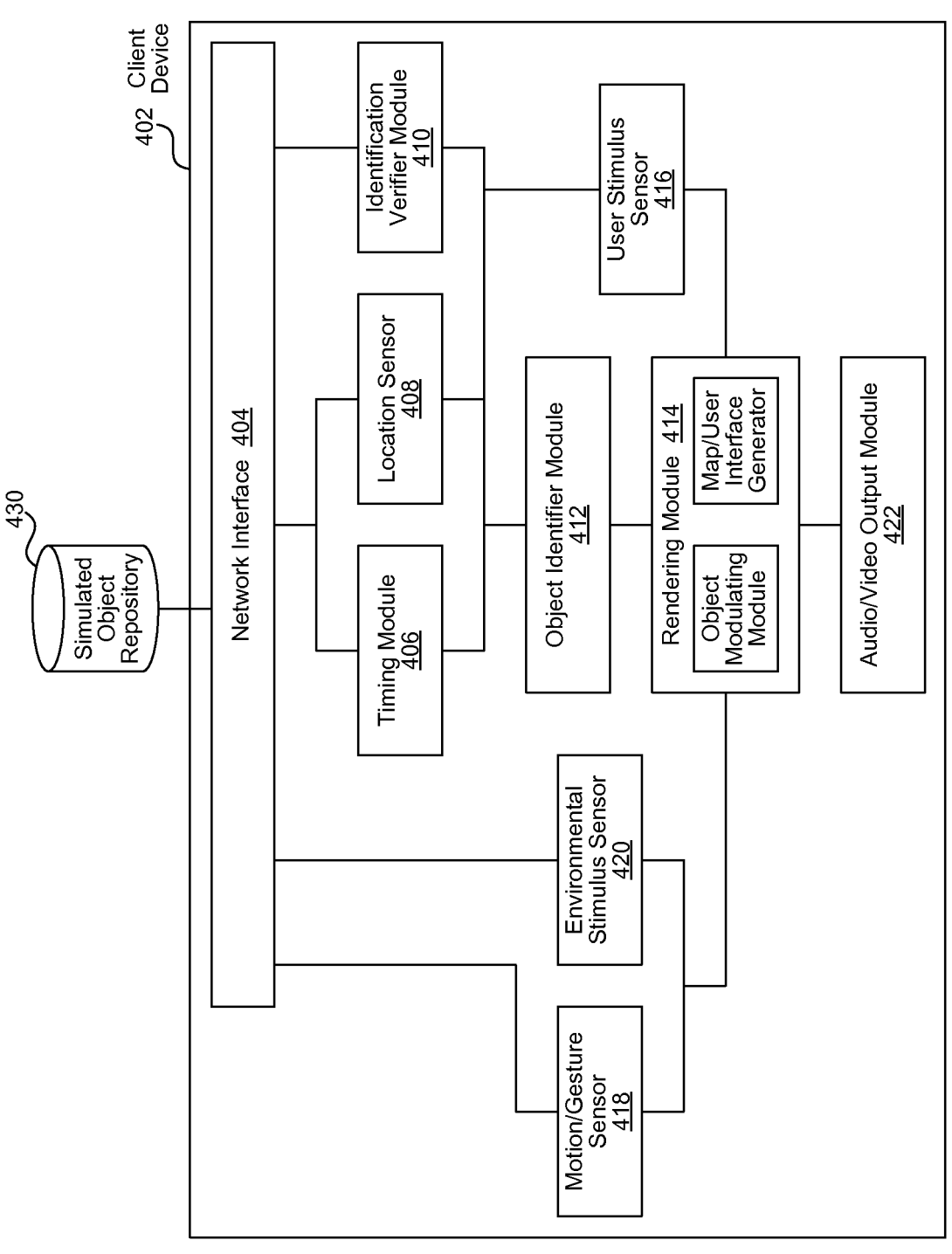
FIG. 4A depicts an example functional block diagram of a client device that presents simulated objects to a user and processes interactions with the simulated objects.

FIG. 4A depicts an example functional block diagram of a client device 402 that presents simulated objects to a user and processes interactions with the simulated objects.

The client device 402 includes a network interface 404, a timing module 406, a location sensor 408, an identification verifier module 410, an object identifier module 412, a rendering module 414, a user stimulus sensor 416, a motion/gesture sensor 418, an environmental stimulus sensor 420, and/or an audio/video output module. The client device 402 may be any electronic device such as the devices described in conjunction with the client devices 102A-N in the example of FIG. 1 including but not limited to portable devices, a computer, a server, location-aware devices, mobile phones, PDAs, laptops, palmtops, iPhones, cover headsets, heads-up displays, helmet mounted display, head-mounted display, scanned-beam display, wearable computer such as mobile enabled watches, and/or any other mobile interfaces and viewing devices, etc.

In one embodiment, the client device 402 is coupled to a simulated object repository 430. The simulated object repository 430 may be internal to or coupled to the client device 402 but the contents stored therein can be illustrated with reference to the example of a simulated object repository 130 described in the example of FIG. 1.

Additional or less modules can be included without deviating from the novel art of this disclosure. In addition, each module in the example of FIG. 4A can include any number and combination of sub-modules, and systems, implemented with any combination of hardware and/or software modules.

The client device 402, although illustrated as comprised of distributed components (physically distributed and/or functionally distributed), could be implemented as a collective element. In some embodiments, some or all of the modules, and/or the functions represented by each of the modules can be combined in any convenient or known manner. Furthermore, the functions represented by the modules can be implemented individually or in any combination thereof, partially or wholly, in hardware, software, or a combination of hardware and software.

In the example of FIG. 4A, the network interface 404 can be a networking device that enables the client device 402 to mediate data in a network with an entity that is external to the host server, through any known and/or convenient communications protocol supported by the host and the external entity. The network interface 404 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

One embodiment of the client device 402 includes a timing module 406. The timing module 406 can be any combination of software agents and/or hardware modules able to identify, detect, transmit, compute, a current time, a time range, and/or a relative time of a request related to simulated objects/environments.

The timing module 406 can include a local clock, timer, or a connection to a remote time server to determine the absolute time or relative time. The timing module 406 can be implemented via any known and/or convenient manner including but not limited to, electronic oscillator, clock oscillator, or various types of crystal oscillators.

In particular, since manipulations or access to simulated objects depend on a timing parameter, the timing module 406 can provide some or all of the needed timing data to authorize a request related to a simulated object. For example, the timing module 406 can perform the computations to determine whether the timing data satisfies the timing parameter of the criteria for access or creation of a simulated object. Alternatively the timing module 406 can provide the timing information to a host server to determination of whether the criteria are met.

The timing data used for comparison against the criteria can include, the time of day of a request, the date of the request, a relative time to another event, the time of year of the request, and/or the time span of a request or activity pertaining to simulated objects. For example, qualifying timing data may include the time the location of the device 402 satisfies a particular location-based criteria.

One embodiment of the client device 402 includes a location sensor 408. The location sensor 408 can be any combination of software agents and/or hardware modules able to identify, detect, transmit, compute, a current location, a previous location, a range of locations, a location at or in a certain time period, and/or a relative location of the client device 402.

The location sensor 408 can include a local sensor or a connection to an external entity to determine the location information. The location sensor 408 can determine location or relative location of the client device 402 via any known or convenient manner including but not limited to, GPS, cell phone tower triangulation, mesh network triangulation, relative distance from another location or device, RF signals, RF fields, optical range finders or grids, etc.

Since simulated objects and environments are associated with or have properties that are physical locations in the real world environment, a request pertaining to simulated objects/environments typically include location data. In some instances, access permissions of simulated objects/environments are associated with the physical location of the client device 402 requesting the access. Therefore, the location sensor 408 can identify location data and determine whether the location data satisfies the location parameter of the criteria. In some embodiments, the location sensor 408 provides location data to the host server (e.g., host server 324 of FIG. 3A) for the host server to determine whether the criteria is satisfied.

The type of location data that is sensed or derived can depend on the type of simulated object/environment that a particular request relates to. The types of location data that can be sensed or derived/computed and used for comparison against one or more criteria can include, by way of example but not limitation, a current location of the client device 402, a current relative location of the client device 402 to one or more other physical locations, a location of the client device 402 at a previous time, and/or a range of locations of the client device 402 within a period of time. For example, a location criterion may be satisfied when the location of the device is at a location of a set of qualifying locations.

One embodiment of the client device 402 includes an identification verifier module 410. The identification verifier module 410 can be any combination of software agents and/or hardware modules able to verify or authenticate an identity of a user.

Typically, the user's identities are verified when they generate a request pertaining to a simulated object/environment since some simulated objects/environments have user permissions that may be different for varying types of access. The user-specific criteria of simulated object access/manipulation may be used independently of or in conjunction with the timing and location parameters. The user's identity can be verified or authenticated using any known and/or convenient means.

One embodiment of the client device 412 includes an object identifier module 406. The object identifier module 412 can be any combination of software agents and/or hardware modules able to identify, detect, retrieve, present, and/or generate simulated objects for presentation to a user.

The object identifier module 412, in one embodiment, is coupled to the timing module 406, the location sensor 408, and/or the identification verifier module 410. The object identifier module 412 is operable to identify the simulated objects available for access using the device 402. In addition, the object identifier module 412 is able to generate simulated objects, for example, if qualifying location data and qualifying timing data are detected. Availability or permission to access can be determined based on location data (e.g., location data that can be retrieved or received form the location sensor 408), timing data (e.g., timing data that can be retrieved or received form the timing module 406), and/or the user's identity (e.g., user identification data received or retrieved from the identification verifier module 410).

When simulated objects are available and that the access criteria are met, the object identifier module 410 provides the simulated object for presentation to the user via the device 402. For example, the simulated object may be presented via the audio/video output module 422. Since simulated objects may be associated with physical locations in the real world environment, these objects may only be available to be presented when the device 402 is located at or near these physical locations. Similarly, since simulated objects may be associated with real objects in the real environment, the corresponding simulated objects may be available for presentation via the device 402 when near at the associated real objects.

One embodiment of the client device 412 includes a rendering module 414. The rendering module 414 can be any combination of software agents and/or hardware modules able to render, generate, receive, retrieve, and/or request a simulated environment in which the simulated object is provided. The simulated environment is also provided for presentation to a user via the client device 402.

In one embodiment, the rendering module 414 also updates simulated objects or their associated characteristics/attributes and presents the updated characteristics via the device 402 such that they can be perceived by an observing user. The rendering module 414 can update the characteristics of the simulated object in the simulated environment according to external stimulus that occur in the real environment surrounding the device 402. The object characteristics can include by way of example but not limitation, movement, placement, visual appearance, size, color, user accessibility, how it can be interacted with, audible characteristics, etc.

The external stimulus occurring in the real world that can affect characters of simulated objects can include, environmental factors in a physical location, user stimulus, provided by the user of the device 402 or another user using another device and/or at another physical location, motion/movement of the device 402, gesture of the user using the device 402. In one embodiment, the user stimulus sensor 416 receives a request from the user to perform a requested action on a simulated object and can updating at least a portion of the characteristics of the simulated object presented on the device 402 according to the effect of the requested action such that updates are perceived by the user. The user stimulus sensor 416 may determine, for example, using the identification verifier module 410, that the user is authorized to perform the requested action before updating the simulated object.

In one embodiment, the motion/gesture sensor 418 is operable to detect motion of the device 402. The detected motion is used by the rendering module 414 to adjusting a perspective of the simulated environment presented on the device according to the detected motion of the device. Motion detecting can include detecting velocity and/or acceleration of the device 402 or a gesture of the user handling the device 402. The motion/gesture sensor 418 can include for example, an accelerometer.

In addition, based on updated locations of the device (e.g., periodically or continuously determined by the location sensor 408 and/or the rendering module 414), an updated set of simulated objects available for access are identified, for example, by the object identifier module 412 based on the updated locations and presented for access via the device 402. The rendering module 414 can thus update the simulated environment based on the updated set of simulated object available for access.

The environmental stimulus sensor 420 can detect environmental factors or changes in environmental factors surrounding the real environment in which the device 402 is located. Environmental factors can include, weather, temperature, topographical characters, density, surrounding businesses, buildings, living objects, etc. These factors or changes in them can affect the positioning or characters of simulated objects and the simulated environments in which they are presented to a user via the device 402. The environmental stimulus sensor 420 senses these factors and provides this information to the rendering module 414 to update simulated objects and/or environments.

In one embodiment, the rendering module 414 generates or renders a user interface for display on the device 402. The user interface can include a map of the physical location depicted in the simulated environment. In one embodiment, the user interface is interactive in that the user is able to select a region on the map in the user interface. The region that is selected generally corresponds to a set of selected physical locations. The object identifier module 412 can then detect the simulated objects that are available for access in the region selected by the user for presentation via the device 402.

The host server 402 represents any one or a portion of the functions described for the modules. More or less functions can be included, in whole or in part, without deviating from the novel art of the disclosure.

Figure 4B:
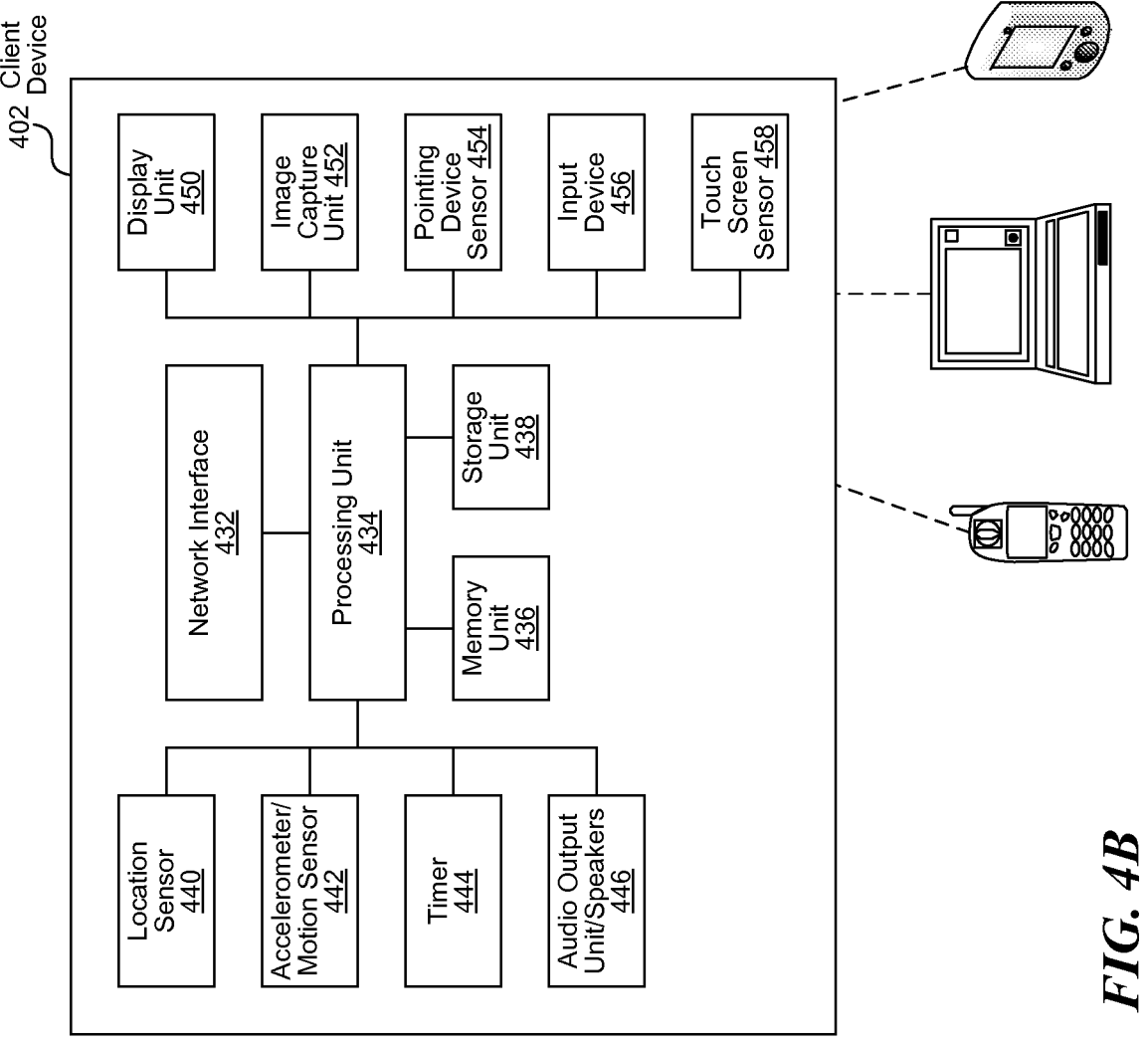
FIG. 4B depicts an example block diagram of the client device that presents simulated objects to a user and facilitates user interactions with the simulated objects.

FIG. 4B depicts an example block diagram of the client device 402 that presents simulated objects to a user and facilitates user interactions with the simulated objects.

In one embodiment, client device 402 includes a network interface 432, a processing unit 434, a memory unit 436, a storage unit 438, a location sensor 440, an accelerometer/motion sensor 444, an audio output unit/speakers 446, a display unit 450, an image capture unit 452, a pointing device/sensor 454, a input device 456, and/or a touch screen sensor 458. Additional or less units or modules may be included. The client device 402 can be any combination of hardware components and/or software agents for that presenting simulated objects to a user and facilitating user interactions with the simulated objects. The network interface 432 has been described in the example of FIG. 4A.

One embodiment of the client device 402 further includes a processing unit 434. The location sensor 440, motion sensor 442, and timer 444 have been described with reference to the example of FIG. 4A.

The processing unit 434 can include one or more processors, CPUs, microcontrollers, FPGAs, ASICs, DSPs, or any combination of the above. Data that is input to the client device 402 for example, via the image capture unit 452, pointing device/sensor 554, input device 456 (e.g., keyboard), and/or the touch screen sensor 458 can be processed by the processing unit 434 and output to the display unit 450, audio output unit/speakers 446 and/or output via a wired or wireless connection to an external device, such as a host or server computer that generates and controls access to simulated objects by way of a communications component.

One embodiment of the client device 402 further includes a memory unit 436 and a storage unit 438. The memory unit 436 and a storage unit 438 are, in some embodiments, coupled to the processing unit 434. The memory unit can include volatile and/or non-volatile memory. In generating and controlling access to the simulated objects, the processing unit 434 may perform one or more processes related to presenting simulated objects to a user and/or facilitating user interactions with the simulated objects.

In some embodiments, any portion of or all of the functions described of the various example modules in the client device 402 of the example of FIG. 4A can be performed by the processing unit 434. In particular, with reference to the client device illustrated in FIG. 4A, the timing module, the location sensor, the identification verifier module, the object identifier module, the rendering module, the user stimulus sensor, the motion gesture sensor, the environmental stimulus sensor, and/or the audio/video output module can be performed via any of the combinations of modules in the control subsystem that are not illustrated, including, but not limited to, the processing unit 434 and/or the memory unit 436.

Figure 5A:
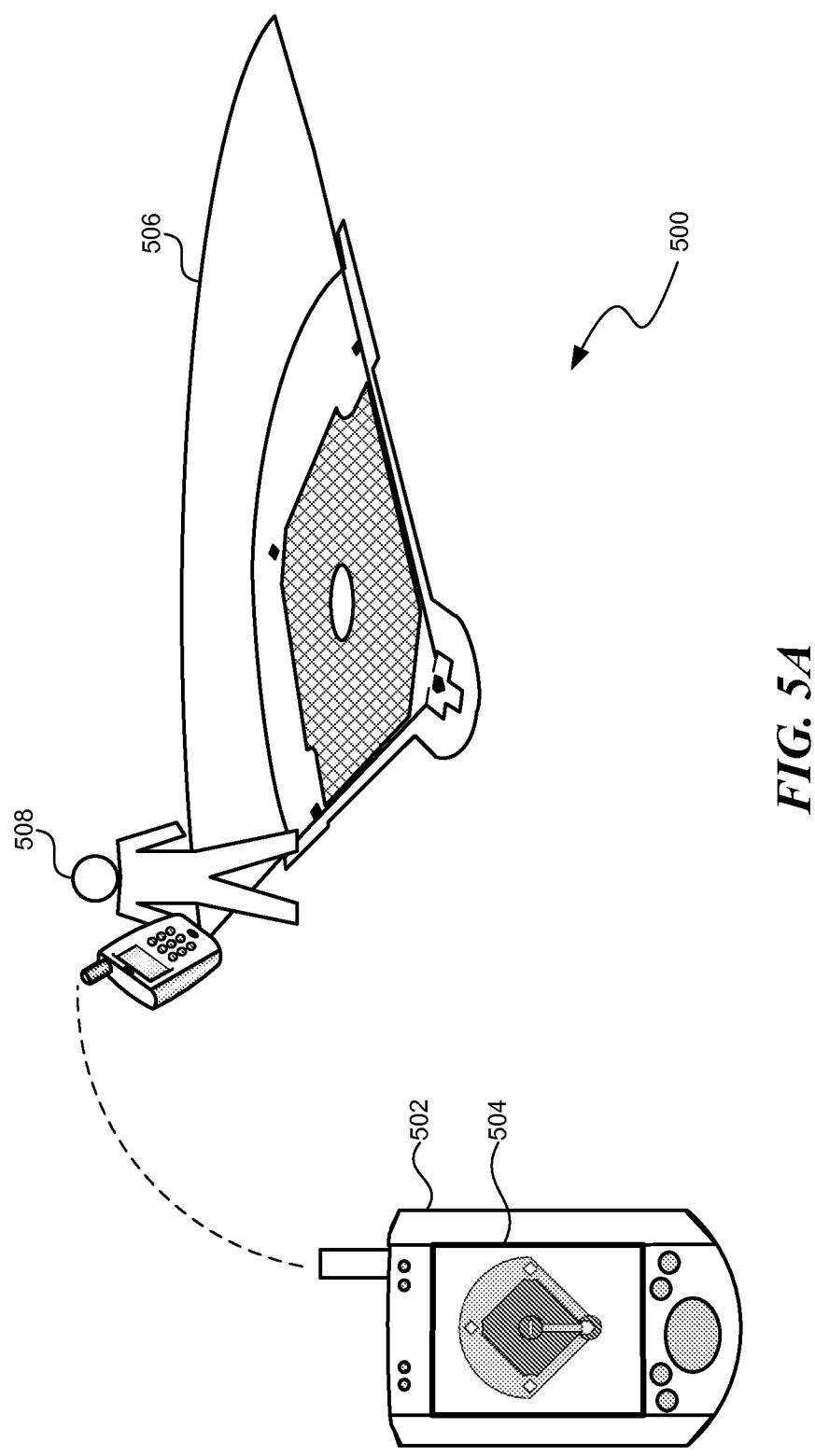
FIG. 5A illustrates a diagrammatic example of a simulated playing field that is provided via a device.

FIG. 5A illustrates a diagrammatic example 500 of a simulated playing field 504 that is provided via a device 502.

The simulated playing field 504 may be a simulation of a real life playing field 506. In the example of FIG. 5A, the real life baseball field 506 is simulated in the simulated playing field 504 and presented via the device 502 to the user 508.

The simulated playing field 504 is a simulated environment that includes simulated objects that correspond in features and characteristics of the real life playing field 506. The simulated objects presented via the device 502 may also include interactive features and can be interacted with or manipulated by the user 508 such that the user 508 perceives the virtual sports game occurring in the simulated playing field 504 like a sports game occurring in the real world environment 506. The user 508 and other users can be real participants of the virtual sports game that are in the real life playing field 506 of the real world environment.

Figure 5B:
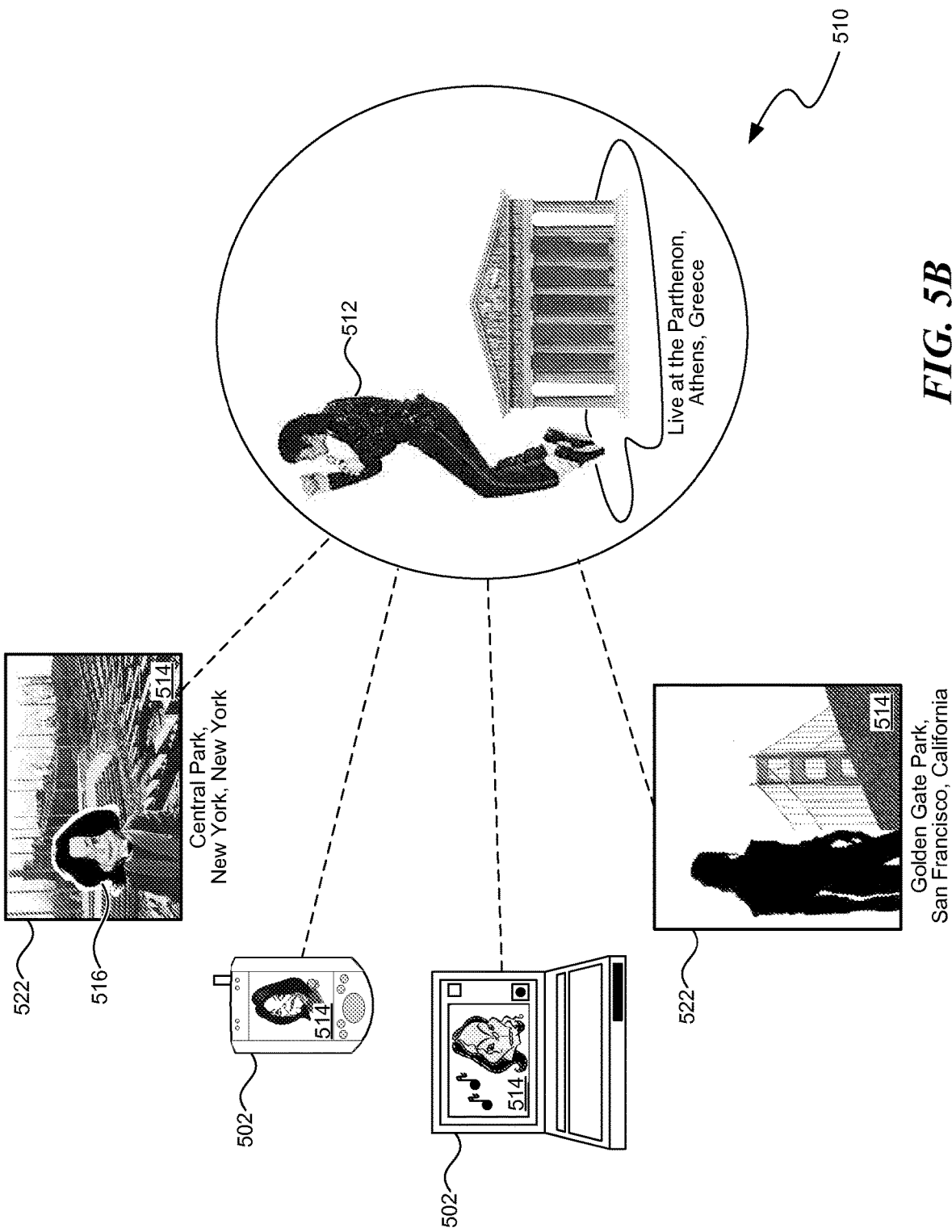
FIG. 5B illustrates a diagrammatic example of virtual performances with a simulated object that is controlled by a real performer.

FIG. 5B illustrates a diagrammatic example 510 of virtual performances 514 with a simulated object 516 that is controlled by a real performer 512 in a real world environment.

The virtual performances 514 are simulations of a real performance performed by the real performer 512, who may be giving a live performance in the real world environment and may be located in a physical location distinct from the locations of the devices 502 on which the virtual performances 514 are presented.

The virtual performance 514 includes a simulated object 516 that is controlled by the real performer 512 and generally has characteristics that resemble those of the real performer 512. For example, the simulated object 516 may have rendered visual features that are similar to those of the facial features of the real performer 512. In addition, the motion of the simulated object may be rendered according to the movement of the real performer 512 while giving the real performance.

In one embodiment, the simulated object 516 includes audio data that is generated by the real performer 512 or is synthesized based on the audio generated by the real performer 512 during the real performance. The audio data may also include sound effects or background music generated in the live performance and/or additional simulated/synthesized sounds. The virtual performance 514 including the simulated object 516 may be presented on a device 522 (e.g., a LCD display, a plasma display, etc.) that is suitable sized to display a fill-sized or a portion of a full-sized adult human being. The virtual performance may be presented in real time or near real time when then live performance is being given by the real performer 512. The virtual performance may also be presented at a delayed time from the live performance, which may be a concert, a play, and/or a presentation.

Figure 5C:
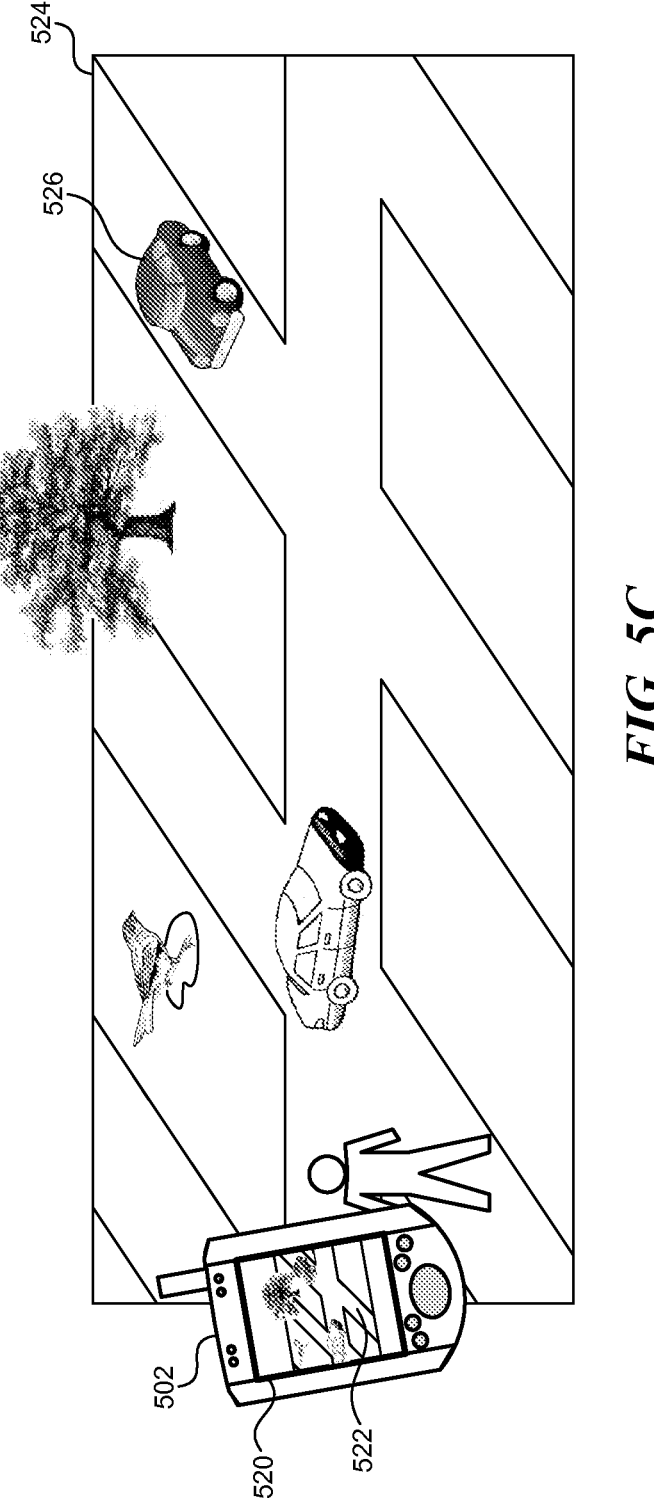
FIG. 5C illustrates an example screenshot on a device displaying a simulated environment with a simulated object associated with a physical object in a physical location in the real world environment.

FIG. 5C illustrates an example screenshot on a device 502 having a simulated environment 520 with a simulated object 522 that is associated with a physical object 526 in a physical location in the real world environment 524.

The motion, behavior, and/or action of the simulated object 522 may partially or wholly depend on the motion, behavior, and/or action of the physical object 526. For example, the movement of the simulated object 522 in the simulated environment 520 may correspond to the movement of the car 526 in the real world 524. The dependence may be pre-programmed and may be re-configured by the user.

Figure 5D:
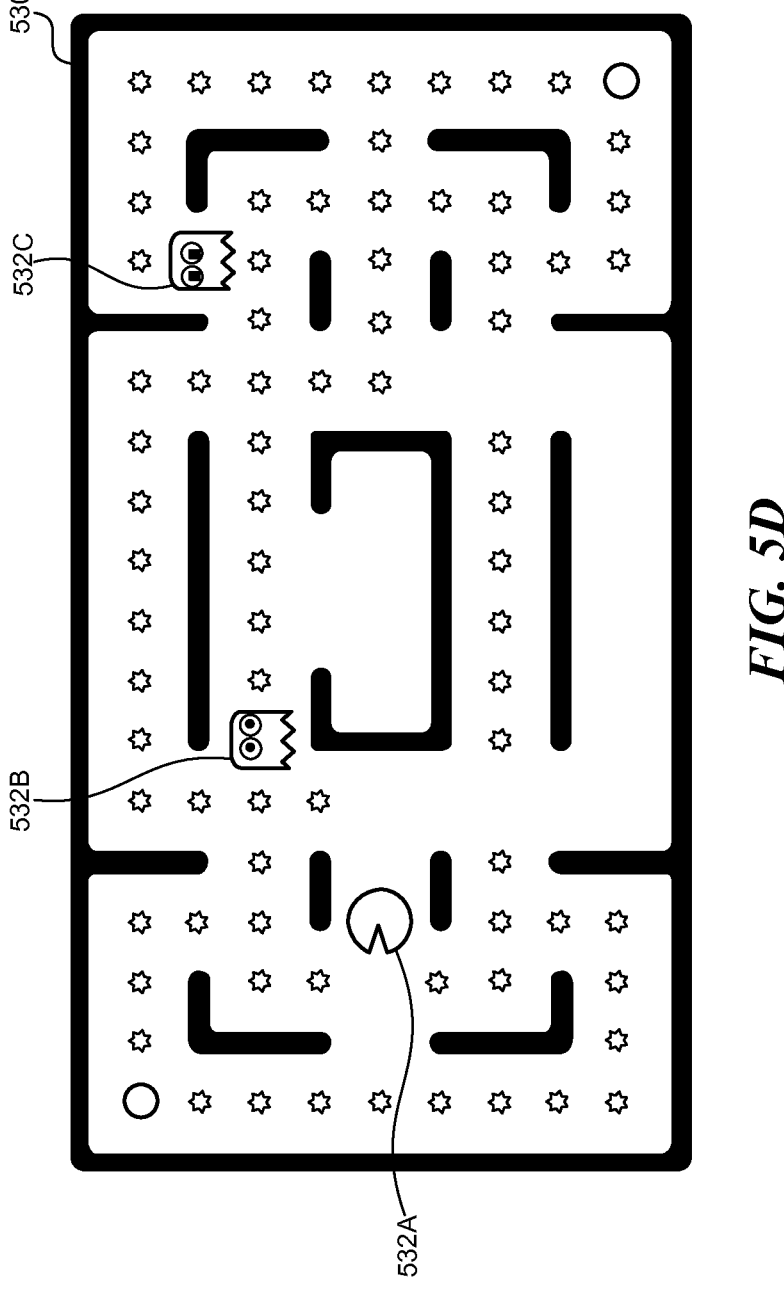
FIG. 5D illustrates a diagrammatic example of an arcade game in a gaming environment that corresponds to a physical location and real players in a real world environment.

FIG. 5D illustrates a diagrammatic example of an arcade game in a gaming environment 530 that corresponds to a physical location in a real world environment.

The arcade game shown in the example of FIG. 5D includes by way of example but not limitation, a Pacman game 530. The Pacman game 530 may include simulated objects 532A-C that are associated with physical objects or real people in the real world environment. For example, the simulated objects 532A-C may be associated with real cars on real streets. In addition, the simulated object 532A may be controlled by a real person walking in the physical location in the real world environment and the simulated object 532B may be controlled by another real person. One or more of the simulated objects 532A-C may also be partially or fully controlled (e.g., with little or no dependence on actions of real users) by a computer program.

Note that although an example is specifically provided for a Pacman game, the arcade games that can include simulated objects that are associated with physical objects or real people in the real world environment can include other types of arcade games or strategy games including but not limited to, Centipede, Frogger, Chess, Checkers, Othello, etc.

Figure 5E:
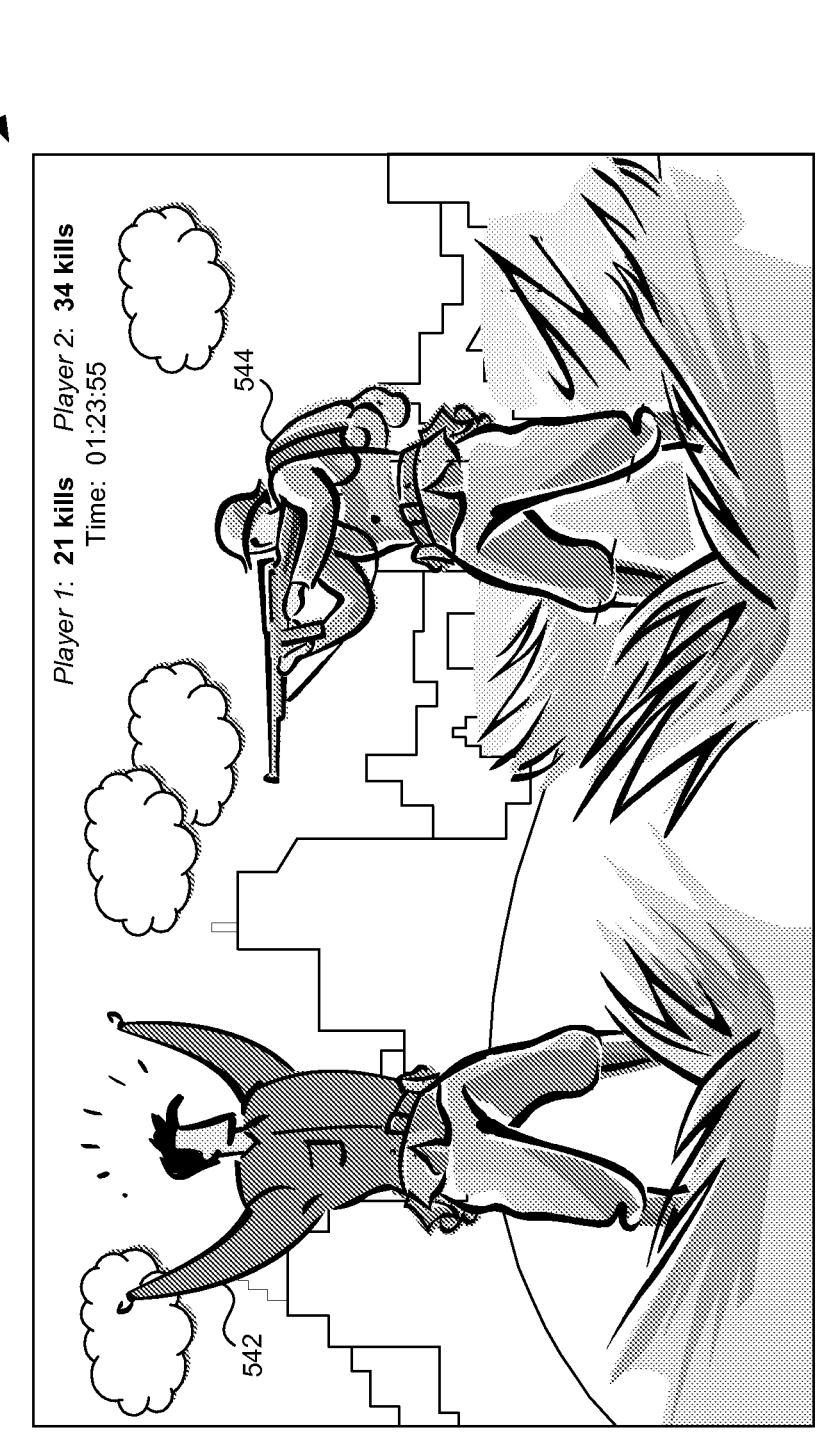
FIG. 5E illustrates a diagrammatic example of a virtual game having a simulated combat environment that is played by a real user in a real world environment via a device.

FIG. 5E illustrates a diagrammatic example of a virtual game 540 having a simulated combat environment that is played by a real user in a real world environment via a device.

The virtual game 540 generally includes a simulated object (e.g., simulated object 542) that is controlled or otherwise operated by a real user (e.g., a user of the device on which the virtual game 540 is presented). The virtual game 540 can optionally include a second simulated object (e.g., the simulated object 544), with which the simulated object 452 interacts. The second simulated object 544 can be controlled by another real user, a computer program, or a combination of the above. For example, the second simulated object 544 may be a real or simulated opponent in the combat environment with whom the simulated object 542 controlled by the real user is in combat.

In general, the simulated combat environment or other virtual gaming environment 540 can include multiple simulated objects comprising, one or more of reward items, ammunition, barriers, goblins, places, events, and other characters. Each object may be controlled by a real user, simulated purely in software, or a combination of the above.

Figure 5F:
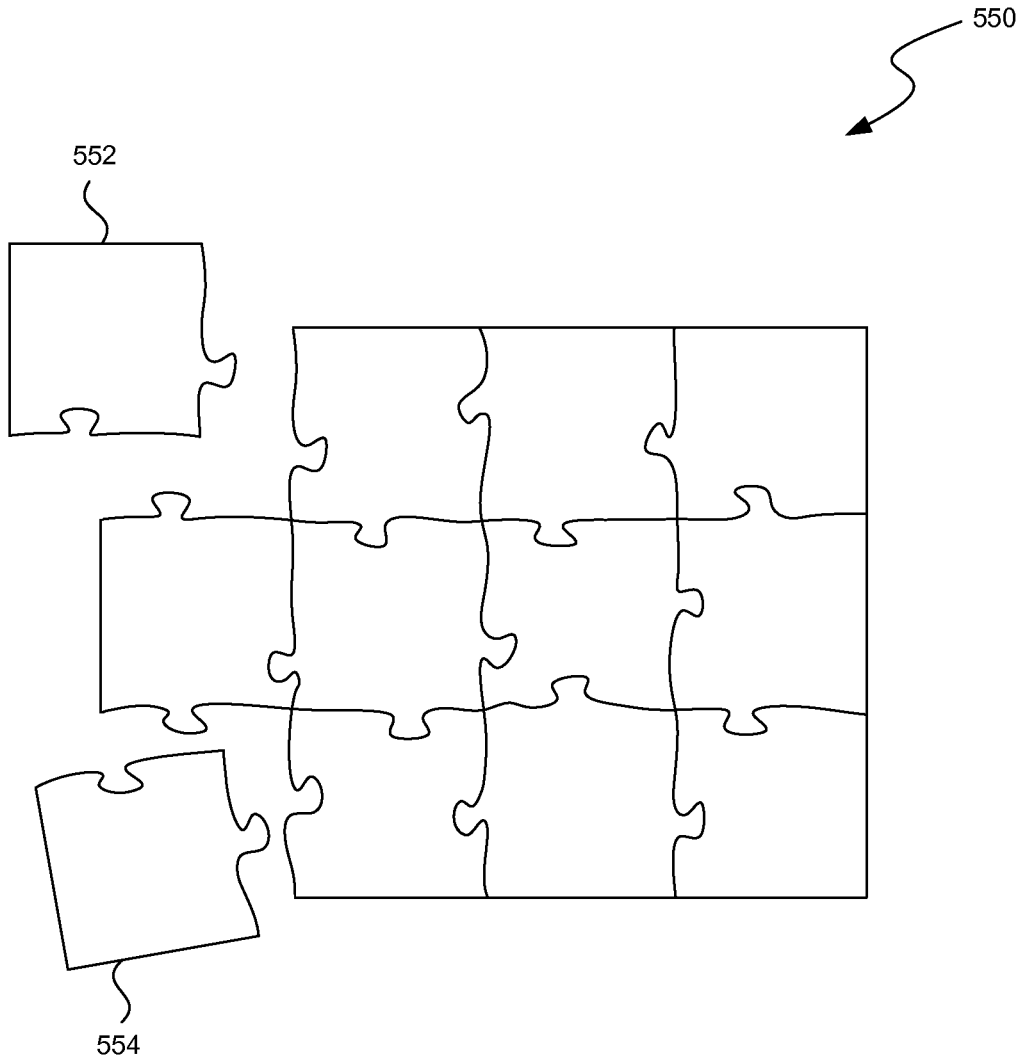
FIG. 5F illustrates a diagrammatic example of a simulated object representing an interactive puzzle or a component thereof.

FIG. 5F illustrates a diagrammatic example of a simulated object representing an interactive puzzle 550 or a component 552 thereof.

Note that although the interactive puzzle 550 is illustrated in the form as being a construction 2D puzzle, any other type of puzzle or, maze, 3D puzzle, or mathematical game having a digital form, can be represented by a simulated object, including but not limited to, word puzzles, jigsaw puzzles, word puzzles, tower of Hanoi, stick puzzles, tiling puzzles, transport puzzles, and/or mechanical puzzles, etc.

In addition to the simulated object representing the puzzle, each component or some components of the puzzle 550 can be represented by simulated objects. In the example of the construction puzzle 550 that is shown, each component 552 and/or 554 can be represented individually by simulated objects, which may be controlled by real users and/or by software programs.

FIG. 5G illustrates a diagrammatic example of simulated objects that represent real-time or near-real time information/data projected onto geographical locations in a map 560.

The example map 560 includes geographical locations spanning North America. Note that multiple simulated objects that represent real-time or near real-time information (e.g., information that changes dynamically), non-real time information (e.g., static information) can be projected onto the map 560 at the relevant geographical locations. A map spanning an entire continent and multiple countries is illustrated as an example and other types of maps having projected thereon, simulated objects that include real-time or near real-time information/news or static information are contemplated. For example, a map of a state, county, city, the downtown area of a major city, a specific neighborhood can include simulated objects associated with information about the location or location range, physical entities in the location, and/or real people in the location.

For example, in the map 560, simulated object 562 is associated with New York City and projected at such a location in the map 560 of North America. In this example, the simulated object 562 depicts information and news including real time information and updates regarding the outbreak of the Swine Flu identifying the number of confirmed cases and suspected cases. Other relevant information can be depicted including the number of inbound flights and outbound flights from/to Mexico, respectively, where the outbreak of the Swine Flu is suspected to have broken out. Other simulated objects (e.g., objects 564, 566, and 568) can be associated with other geographical locations and can depict similar such real time/near real time or static information/data.

In some embodiments, simulated objects are associated with real entities or real people (e.g., entities or people at particular geographical locations). Such simulated objects can include information or data (which can include real time information that changes dynamically or static information) about the people or entities that are in or near a particular geographical location. Such simulated objects can be spatially presented (e.g., on a 2D or 3D map) in a manner that corresponds to the actual physical locations of these entities/individuals.

In some instances, the simulated objects that are associated with real (e.g., physical) entities or real people can be accessed (e.g., viewed and/or interacted with) by users via devices when the user is physically near or at the real entity or near the real person.

For example, when the user is near a physical store, the user may be able to access a representation of the physical store via simulated objects. Thus, through the virtual representation and the simulated objects, the user can see if it is now open, what is on sale now, how crowded it is now, etc. Similarly, when the user is near a real person, the user may be able to access a representation (e.g., simulated object) of a real person. The representation and virtual objects can allow the user to see various information associated with the person, including but not limited to, their name and profile, recent blog or microblog posts, recent photos or videos or links or documents added or annotated by them, their recent locations, their current status or interests are for various topics like dating, shopping, professional networking, socializing, etc.

The example map 560 of FIG. 5G includes a simulated object 570 representing a drug store located in Hoboken, New Jersey. Other simulated objects including object 572 associated with facemasks and 574 associated with Tylenol in the drug store can be included. The object 572 can indicate the up-to-state status on the inventory of the face masks at the store and the object 574 can indicate that the item is currently on clearance sale. Potential customers can access this real time or near real-time information, for example, before making a trip the physical store to make their purchase to ensure that the items that they are interested in are either in stock and/or on sale.

Note that the simulated object 570 and the associated objects can be accessed by the user at a remote location. In addition, the simulated object 570 of the drug store can be accessed by the user when they are at or near the store (e.g., within a predetermined or specified distance from the store).

In a further embodiment, the map 560 include a simulated object 576 associated with a real-life pharmacist at the Longs Drugs in Hoboken. The simulated object 576 can include information about the real life pharmacist, by way of example but not limitation, the name of the pharmacist ("Pharmacist Chan"), the hours that the pharmacist works, his/her position, where the degree was obtained, and/or other specialties. In general, the information included in the simulated object 576 can include real time or non-real time information.

In most instances, with various types of simulated objects that represent information at a location, information related to a particular entity or individual, the user can select the type of information that they want to see. Note that the simulated object 576 and the associated objects can be accessed by the user at a remote location. In addition, the simulated object 576 associated with the pharmacist at the drug store can be accessed and/or viewed by the user when they are at or near the store (e.g., within a predetermined or specified distance from the store), or near the pharmacy section in the drug store, for example. The simulated object 576 that is available can be automatically detected and presented to the user using a viewer in a device.

In general, users can specify parameters to filter the types of simulated objects that they would like automatically detected and presented and types of objects that they would not like to see. The parameters can include, by way of example, the time of day, location, distance, types of things represented by the simulated objects, the information contained in the simulated objects, etc.

Figure 6:
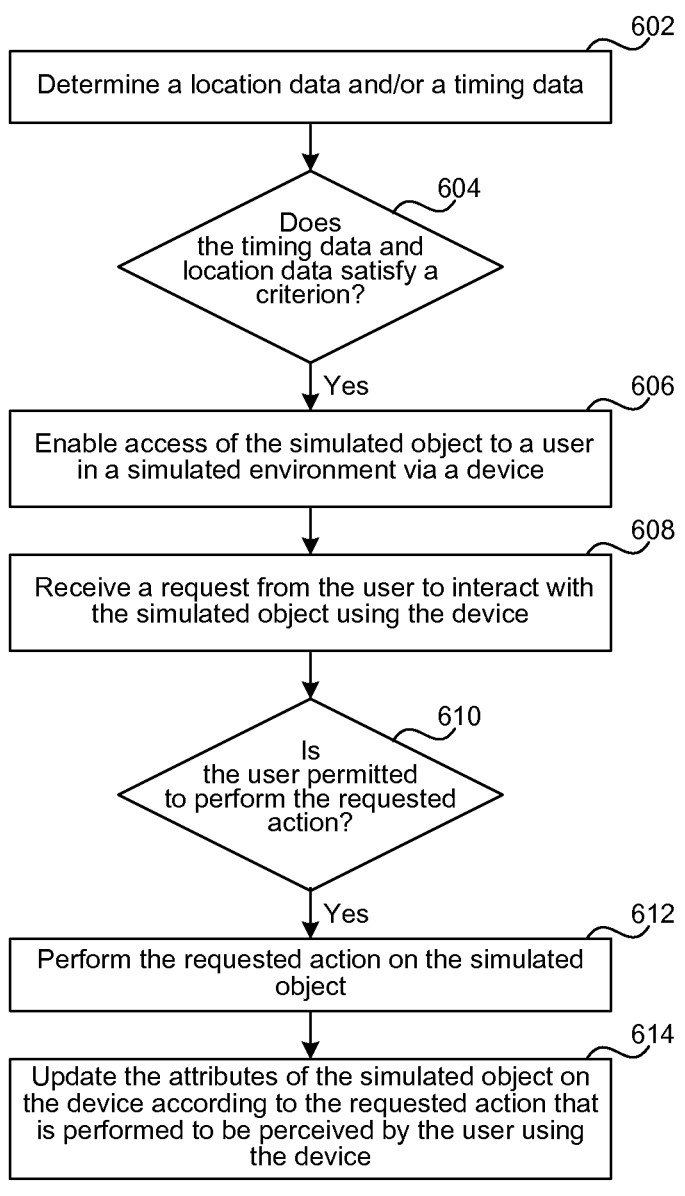
FIG. 6 depicts a flow chart illustrating an example process for time-based control/manipulation of a simulated object that is associated with a physical location in a real world environment.

FIG. 6 depicts a flow chart illustrating an example process for time-based control/manipulation of a simulated object that is associated with a physical location in a real world environment.

In process 602, a location data and/or a timing data are determined. In process 604, it is determined whether the timing data and location data satisfy a criterion. If so, in process 606, access of the simulated object to a user in a simulated environment is enabled via a device. In one embodiment, the location data includes the location of the device and the timing data includes a time when the device is located at the location. The simulated object generally includes attributes that can be perceived by the user via the device. Generally, the device is any electronic device including portable devices such as mobile phones, PDAs, laptop computers that may be location-aware. For example, attributes of the simulated object can include visible characteristics and/or audible characteristics of the simulated object.

In process 608, a request is received from the user to interact with the simulated object using the device. In process 610, it is determined whether the user is permitted to perform the requested action. In general, the user is associated with user access permissions. The object (simulated object) may also be associated with object access permissions.

If so, in process 612, the requested action is performed on the simulated object. In process 614, the attributes of the simulated object are updated on the device according to the requested action that is performed to be perceived by the user using the device. Furthermore, the simulated object can be controlled by another user located in another physical location. The changes to attributes of the simulated object caused by control of another user can be reflected in the simulated environment and perceived by the user via the device in real-time/near real-time, or delayed time (e.g., the changes are stored and presented automatically at a later time or upon request).

Figure 7A:
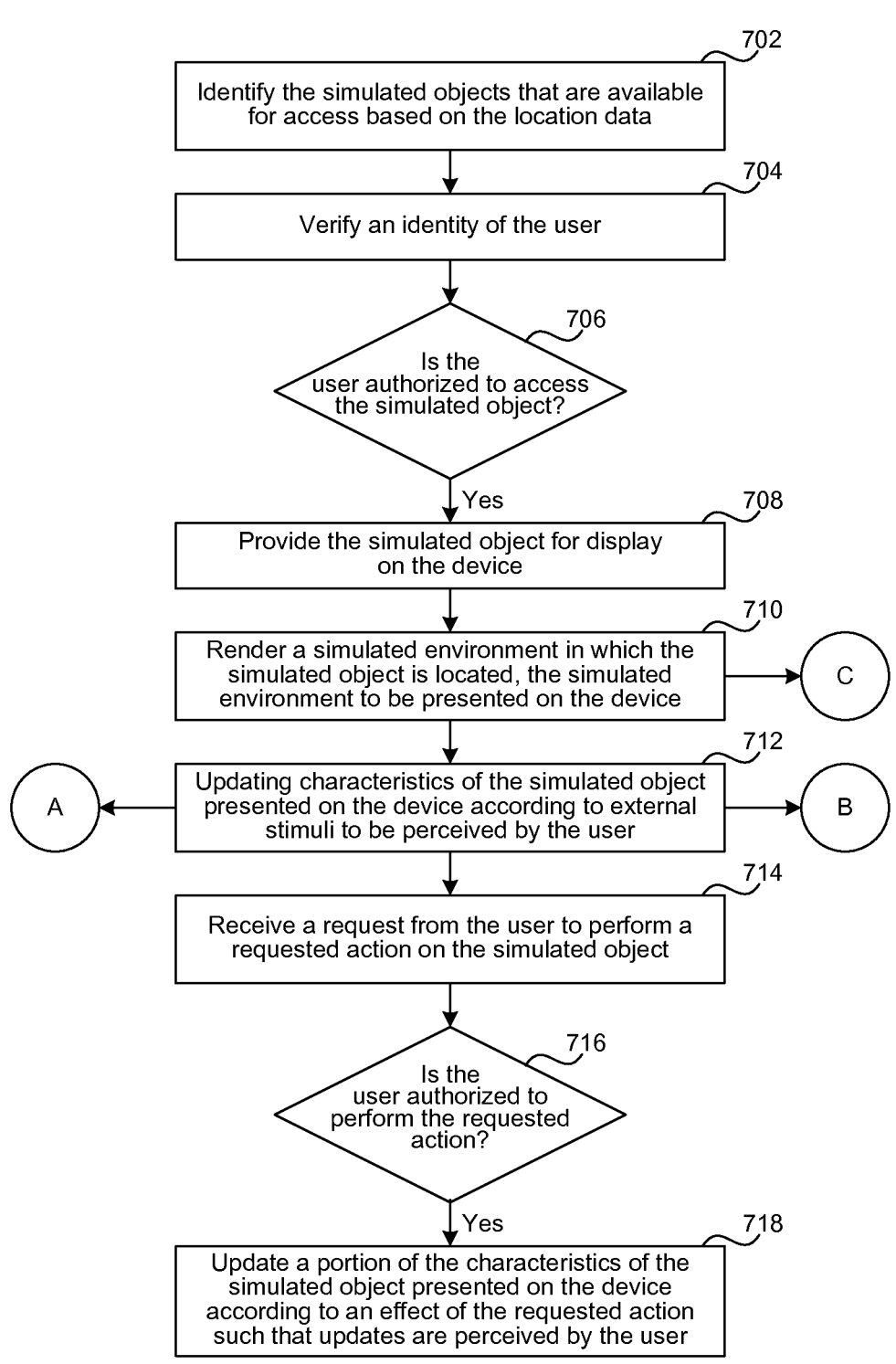
FIG. 7A depicts a flow chart illustrating an example process for facilitating user interaction with a simulated object that is associated with a physical location in a real world environment.

FIG. 7A depicts a flow chart illustrating an example process for facilitating user interaction with a simulated object that is associated with a physical location in a real world environment.

In process 702, the simulated objects that are available for access are identified based on the location data. The location data can include the location of a device for use by a user to access the simulated object in a time period. The simulated objects that are available for access may further be identified using timing data. In process 704, an identity of the user is verified. In process 706, it is determined whether the user is authorized to access the simulated object. If so, in process 708, the simulated object is provided for display on the device. In process 710, a simulated environment in which the simulated object is located is rendered. The simulated environment can be presented on the device.

In process 712, characteristics of the simulated object presented on the device are updated according to external stimulus that occurred in the real environment to be perceived by the user. The external stimulus can include environmental factors in the physical location or user stimulus provided by the user or other users.

In process 714, a request is received from the user to perform a requested action on the simulated object. In process 716, it is determined whether the user authorized to perform the requested action. In process 718, a portion of the characteristics of the simulated object presented on the device according to an effect of the requested action such that updates are perceived by the user.

Figure 7B:
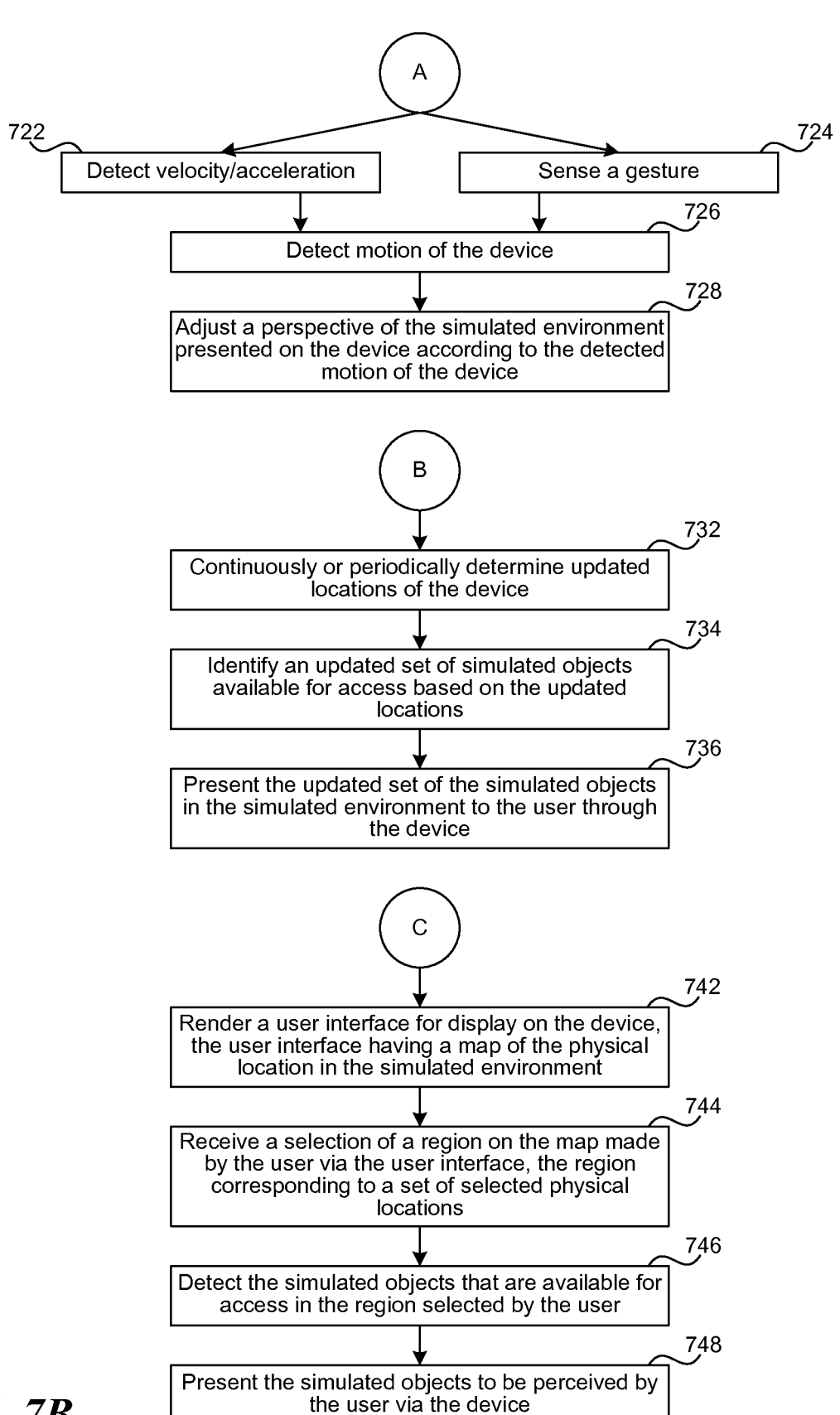
FIG. 7B depicts a flow chart illustrating example processes for updating the simulated object and the simulated environment according to external stimulus.

FIG. 7B depicts a flow chart illustrating example processes for updating the simulated object and the simulated environment according to external stimulus.

In process 722, velocity/acceleration of the device is detected. In process 714, a gesture of the user using the device is sensed. In process 726, a motion of the device is detected based on the detected velocity/acceleration or gesture. In process 728, a perspective of the simulated environment presented on the device is adjusted according to the detected motion of the device.

In process 732, updated locations of the device are continuously or periodically determined. In process 734, an updated set of simulated objects available for access are identified based on the updated locations. In process 736, the updated set of the simulated objects in the simulated environment are presented to the user through the device.

In process 742, a user interface is rendered for display on the device. The user interface can include a map of the physical location in the simulated environment. In process 744, a selection of a region on the map made by the user via the user interface is received. The region can correspond to a set of selected physical locations. In process 746, the simulated objects that are available for access in the region selected by the user are detected. In process 748, the simulated objects to be perceived by the user are presented via the device.

Figure 8:
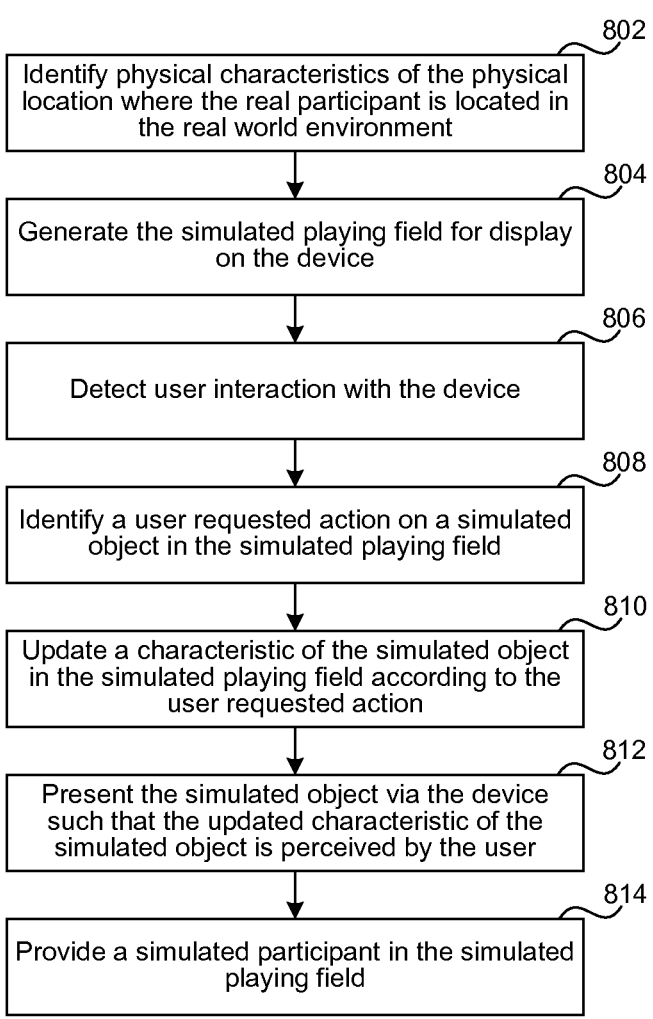
FIG. 8 depicts a flow chart illustrating an example process for simulating a virtual sports game played by a real participant in a real world environment.

FIG. 8 depicts a flow chart illustrating an example process for simulating a virtual sports game played by a real participant in a real world environment.

In process 802, physical characteristics of the physical location in the real world environment where the real participant is located are identified. In process 804, the simulated playing field is generated for display on the device. The simulated playing field generally represents a physical location in the real world environment. In one embodiment, a size of the simulated playing field is determined based on a size of the physical location. In process 806, user interaction with the device is detected. In process 808, a user requested action on a simulated object in the simulated playing field is identified. The user requested action typically corresponds to an action that corresponds to a type of sports of the virtual sports game and the simulated object is a simulated ball controlled by the user in a manner that corresponds to the type of sports of the virtual sports game.

In process 810, a characteristic of the simulated object in the simulated playing field is updated according to the user requested action. In process 812, the simulated object is presented via the device to such that the updated characteristic of the simulated object is perceived by the user.

In process 814, a simulated participant in provided the simulated playing field. The simulated participant can be programmed to act as a teammate or opponent of the real participant. The simulated participant can also perform actions on the simulated object.

FIG. 9 depicts a flow chart illustrating an example process for simulating a virtual game played by a real user in a real world environment.

In process 902, a gaming environment is generated. The gaming environment corresponds to a physical location in the real world environment where the real user is located. In addition, the gaming environment includes characteristics that correspond to the physical characteristics of the physical location and includes simulated objects that can be controlled by the real user. In process 904, a gaming environment is provided to the real user via the device.

In process 906, movement of the real user is detected. In process 908, a characteristic of the simulated object is updated in the gaming environment at least partially based on the movement of the real user. In general, the accessibility of the simulated object via the device depends on the location of the device and/or a time or time range when the device is located at the location.

In process 910, user interaction with the device is detected. In process 912, a user requested action on the simulated object in the gaming environment is identified. In process 914, the simulated object is updated in the gaming environment according to the user requested action. In process 916, movement of a second real user is detected. In process 918, the second simulated object is updated in the virtual gaming environment at least partially based on the movement of the second real user. The second simulated object may interact with the simulated object in the gaming environment.

In general, the gaming environment includes multiple simulated objects including but not limited to, reward items, ammunition, barriers, goblins, places, events, and/or other characters. The requested user action with the simulated object can include, collecting a reward item, firing ammunition, throwing an item, consuming an item, attending an event, dialoguing with another character, surmounting a barrier, and/or shooting a goblin.

FIG. 10 a flow chart illustrating an example process for simulating a virtual performance in a real world environment.

In process 1002, a simulated object is generated for display on a device located in the physical location in the real world environment. In one embodiment, the simulated object is controlled by a real performer giving a live performance in the real world environment. The real performer may or may not be necessarily located in the physical location where the simulated object is displayed on the device.

In process 1004, the live performance given by the real performer is monitored. In process 1006, the simulated object is updated in real time or near real time according to the live performance. Alternatively, the simulated object can be updated after a delay (e.g., the updates can be stored and presented at a later time). The real performer may be a musician, an actor/actress, and/or a presenter.

In process 1008, updates to the simulated object are presented on the device in the physical location. Note that the device can be a portable device or suitably sized to display a full-size adult human being. The simulated object can include audio data generated by the real performer or sound effects/background music generated in the live performance.

In process 1010, multiple simulated objects are generated for display on devices located in multiple physical locations. Each of the multiple simulated objects represent the real performer giving the live performance such that the live performance is projected at each of the multiple physical locations in the real world environment.

Figure 11:
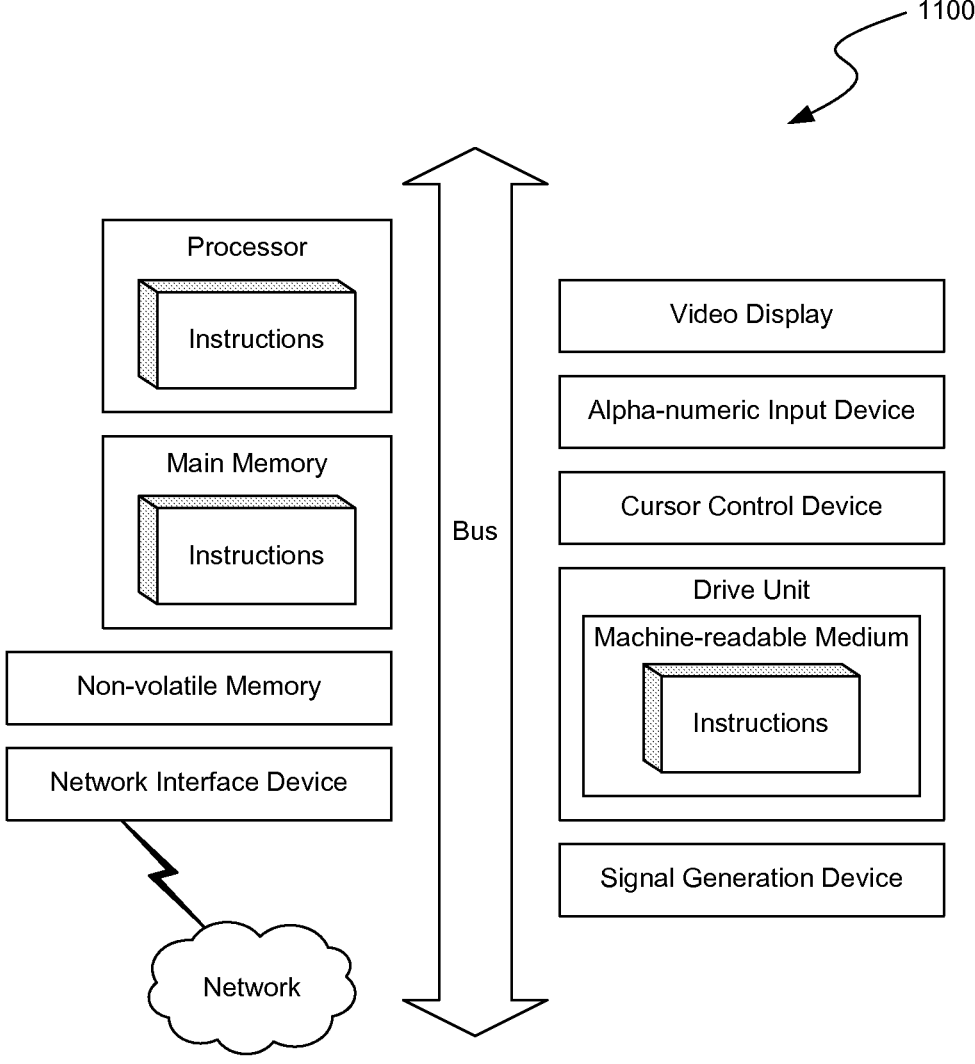
FIG. 11 shows a diagrammatic representation of a machine in the example form of a computer system within which a set of instructions, for causing the machine to perform any one or more of the methodologies discussed herein, may be executed, according to one embodiment.

FIG. 11 shows a diagrammatic representation of a machine in the example form of a computer system 1100 within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a web appliance, a network router, switch or bridge, or any machine capable of executing a set of instructions (sequential or otherwise) that specify actions to be taken by that machine.

While the machine-readable medium is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine or computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

What is claimed is:

1. A method performed by a device of facilitating interaction with a simulated object that is associated with a physical object other than a user at a physical location in a real environment, the method comprising:
    rendering, by the device, a user interface including a map of a physical location;
    receiving, by the device, a selection of a region on the map made by the user via the user interface, the region corresponding to the physical location;
    obtaining, by the device, location data of the device while displaying at least one image obtained by a camera of the device;
    in response to determining that the location data obtained by the device satisfies a criterion specifying where the simulated object associated with the physical object can be generated, providing, by the device, the simulated object with the at least one image obtained by the camera, wherein the simulated object is associated with the physical location; and
    based on change of a motion of the device, terminating the displaying of the simulated object and the at least one image and displaying, without further input other than the motion of the device, the user interface including the map of the physical location.

2. The method of claim 1, further comprising:
    detecting an external stimulus occurring in the real environment surrounding the device,
    wherein the external stimulus comprises environmental factors of the real environment.

3. The method of claim 2, further comprising:
    detecting whether the external stimulus is changed; and
    in response to detecting that the external stimulus is changed, adjusting the simulated object.

4. The method of claim 3, further comprising:
    in response to detecting that the external stimulus is changed, providing another simulated object with the at least one image obtained by the camera.

5. The method of claim 1, wherein the simulated object comprises at least one indication for indicating a destination of the device.

6. The method of claim 1, wherein the simulated object comprises an advertisement based on the location data of the device.

7. The method of claim 1, further comprising:
    continuously or periodically determining updated locations of the device;
    identifying an updated set of simulated objects available for access based on the updated locations; and
    accordingly presenting the updated set of simulated objects in a simulated environment.

8. The method of claim 1, wherein the device comprises a head-mounted display device.

9. A device comprising:
    a location sensor;
    a camera;
    a display;
    memory storing one or more computer programs; and
    one or more processors communicatively coupled to the location sensor, the camera, the display, and the memory,
    wherein the one or more computer programs include computer-executable instructions that, when executed by the one or more processors individually or collectively, cause the device to:
        render a user interface including a map of a physical location,
        receive a selection of a region on the map made by a user via the user interface, the region corresponding to the physical location,
        obtain location data of the device while displaying at least one image obtained by the camera,
        in response to determining that the location data satisfies a criterion specifying where a simulated object associated with a physical object can be generated, provide the simulated object with the at least one image obtained by the camera, wherein the simulated object is associated with the physical location, and
        based on a change of a motion of the device, terminate the displaying of the simulated object and the at least one image and display, without further input other than the motion of the device, the user interface including the map of the physical location.

10. The device of claim 9, wherein the one or more computer programs further include computer-executable instructions that, when executed by the one or more processors individually or collectively, cause the device to:
    detect an external stimulus occurring in a real environment surrounding the device, and
    wherein the external stimulus comprises environmental factors of the real environment.

11. The device of claim 10, wherein the one or more computer programs further include computer-executable instructions that, when executed by the one or more processors individually or collectively, cause the device to:

detect whether the external stimulus is changed, and in response to detecting that the external stimulus is changed, adjusting the simulated object.

12. The device of claim 11, wherein the one or more computer programs further include computer-executable instructions that, when executed by the one or more processors individually or collectively, cause the device to:

in response to detecting that the external stimulus is changed, provide another simulated object with the at least one image obtained by the camera.

13. The device of claim 9, wherein the simulated object comprises at least one indication for indicating a destination of the device.

14. The device of claim 9, wherein the simulated object comprises an advertisement based on the location data of the device.

15. The device of claim 9, wherein the one or more computer programs further include computer-executable instructions that, when executed by the one or more processors individually or collectively, cause the device to:

determine updated locations of the device, identify an updated set of simulated objects available for access based on the updated locations, and providing the updated set of simulated objects.

16. The device of claim 9, wherein the device comprises a head-mounted display device.

17. The method of claim 1, wherein the simulated object is controlled by a real performer giving a live performance in the real environment, and wherein the real performer is located at other than the physical location in the real environment.

18. The device of claim 10, wherein the simulated object is controlled by a real performer giving a live performance in the real environment, and wherein the real performer is located at other than the physical location in the real environment.

19. The method of claim 1, wherein the map of the physical location includes indications based on documents associated with the physical location.

* * * * *